United States Patent
Hull

(10) Patent No.: US 12,041,023 B2
(45) Date of Patent: Jul. 16, 2024

(54) APPARATUS, SYSTEM, AND METHOD FOR CONNECTING USERS BY WAY OF A HANGOUT

(71) Applicant: Spillikin Aerospace, LLC, Sunnyvale, CA (US)

(72) Inventor: Christopher T. Hull, Sunnyvale, CA (US)

(73) Assignee: SPILLIKIN AEROSPACE, LLC, Sunnyvale, CA (US)

( * ) Notice: Subject to any disclaimer, the term of this patent is extended or adjusted under 35 U.S.C. 154(b) by 0 days.

(21) Appl. No.: 17/865,262

(22) Filed: Jul. 14, 2022

(65) Prior Publication Data

US 2023/0020211 A1   Jan. 19, 2023

Related U.S. Application Data

(60) Provisional application No. 63/221,842, filed on Jul. 14, 2021.

(51) Int. Cl.
*H04L 51/52* (2022.01)
*H04L 51/222* (2022.01)

(52) U.S. Cl.
CPC ............ *H04L 51/52* (2022.05); *H04L 51/222* (2022.05)

(58) Field of Classification Search
CPC .............................. H04L 51/52; H04L 51/222
See application file for complete search history.

(56) References Cited

U.S. PATENT DOCUMENTS

| | | | | |
|---|---|---|---|---|
| 8,914,483 | B1 * | 12/2014 | Dixon | H04L 51/52 709/227 |
| 10,348,841 | B1 * | 7/2019 | Nierenberg | G06Q 10/02 |
| 2011/0289433 | A1 * | 11/2011 | Whalin | H04L 51/52 715/753 |
| 2012/0165035 | A1 * | 6/2012 | Chen | H04L 51/04 455/456.1 |
| 2013/0031475 | A1 * | 1/2013 | Maor | A63F 13/87 715/706 |
| 2014/0019882 | A1 * | 1/2014 | Chew | H04L 51/52 715/753 |
| 2014/0089223 | A1 * | 3/2014 | Klassen | G06Q 30/02 705/347 |
| 2015/0327038 | A1 * | 11/2015 | Sooriyan | H04W 4/21 705/319 |
| 2016/0173436 | A1 * | 6/2016 | Koolwal | H04L 51/52 709/206 |
| 2017/0255889 | A1 * | 9/2017 | Jones | G06Q 10/06311 |
| 2018/0006993 | A1 * | 1/2018 | Jazayeri | G06Q 10/107 |

(Continued)

*Primary Examiner* — Benjamin M Thieu
(74) *Attorney, Agent, or Firm* — Brill Law Office; Jeffrey Brill

(57) ABSTRACT

An apparatus for setting an orientation mode includes a processor and a memory that stores code executable by the processor to help users connect via a common hangout. In various examples, the code causes the processor to receive a hangout details request from a user over a network. In various examples, the code causes the processor to present hangout details about a hangout to the user. In various examples, the code causes the processor to create a relationship between the user and the hangout in response to a user selecting the hangout. In various examples, the code causes the processor to present follower data to the user, the follower data relating to one or more followers associated with the hangout.

20 Claims, 15 Drawing Sheets

(56) References Cited

U.S. PATENT DOCUMENTS

| | | | |
|---|---|---|---|
| 2018/0083906 A1* | 3/2018 | Jayaram | H04W 12/084 |
| 2018/0174112 A1* | 6/2018 | Breedvelt-Schouten | G06Q 10/1095 |
| 2019/0190874 A1* | 6/2019 | Petrosian | G06F 16/29 |

* cited by examiner

APPARATUS, SYSTEM, AND METHOD FOR CONNECTING USERS BY WAY OF A HANGOUT

CROSS-REFERENCE TO RELATED APPLICATIONS

This application claims the benefit of U.S. Provisional Application No. 63/221,842, filed Jul. 14, 2021, which is hereby incorporated by reference in its entirety.

TECHNICAL FIELD

The present disclosure relates to apparatuses, systems, and methods for connecting users through a common hangout.

BACKGROUND

Various social media platforms exist for facilitating social connections and/or friendships between people; person to person associations. The platforms use a variety of techniques to help users identify, contact, and form a social connection with other users. For example, one platform facilitates in-person meetings between users who have a common interest or hobby.

Unfortunately, existing social media platforms are not centered on a single physical location, entity, or hangout. Conventional tools for social meeting and interaction are lacking.

SUMMARY

The various apparatus, devices, systems, and/or methods of the present disclosure have been developed in response to the present state of the art, and in particular, in response to the problems and needs in the art that have not yet been fully solved by currently available technology. One general aspect of the present disclosure can include a processor; and a memory that stores code executable by the processor to: receive a hangout details request from a user over a network; present hangout details about a hangout to the user; create a relationship between the user and the hangout in response to a user selecting the hangout; and present follower data to the user, the follower data for one or more followers associated with the hangout.

Implementations may include one or more of the following features. The apparatus where the follower data is presented only after the user forms the relationship with the hangout. The apparatus where the code is further executable by the processor to broadcast an impromptu hangout invitation from the user to one or more friends of the user. The hangout details request is associated with at least one of the two or more hangout summaries presented. The apparatus where the code is further executable by the processor to broker a friendship between the user and one or more followers associated with the hangout. The apparatus where the code is further executable by the processor to mediate a communication session between the user and one or more friends of the user. The apparatus where the code is further executable by the processor to present follower presence data to the user for one or more followers associated with the hangout.

One general aspect of the present disclosure can include a method that includes receiving a hangout details request from a user over a network; presenting hangout details about a hangout to the user, creating a relationship between the user and the hangout in response to a user selecting the hangout, and presenting follower presence data to the user of a follower associated with the selected hangout.

Implementations may include one or more of the following features. The method where the follower presence data is presented only after the user forms the relationship with the selected hangout. The method may include broadcasting an impromptu hangout invitation from the user to one or more followers of a hangout in response to a user request. The method may include presenting follower details to the user for followers associated with the selected hangout. The method may include: sending a friend request on behalf of the user to a follower of the selected hangout in response to the user initiating the friend request; registering an acceptance of the friend request by the follower; and creating a friendship between the follower and the user in response to the acceptance by the follower. The hangout-centric events may include a friend of the user changing their presence status for the hangout, an event occurring at the hangout, and a follower starting a work shift at the hangout. The method may include: registering a follower as present at a hangout in response to a check-in message from the follower; and registering a follower as not present at a hangout in response to a check-out message from the follower. Follower presence data may include an indication that the follower is physically present at the selected hangout in response to an affirmative message from the follower. The follower may include one of a host at the hangout, an owner of the hangout, a patron of the hangout, an employee at the hangout, and a user. The method may include mediating a communication session between the user and one or more friends of the user. The communication session is exclusively an asynchronous communication session. The executable code may include code to broadcast an impromptu hangout invitation from the user to one or more friends of the user in response to a user request.

One general aspect of the present disclosure can include a program product may include a computer readable storage medium that stores code executable by a processor. The program product includes code to present a plurality of hangout summaries for a plurality of hangouts within a predefined geographic area in response to a geographic search query from a user; receive a hangout details request for a selected hangout from the user over a network, present hangout details about the selected hangout to the user, create a relationship between the user and the hangout in response to a user requesting a relationship with the selected hangout, present follower data to the user for one or more followers associated with the hangout, and broker a friendship between the user and at least one follower associated with the hangout.

BRIEF DESCRIPTION OF THE DRAWINGS

The advantages, nature, and additional features of exemplary embodiments of the disclosure will become more fully apparent from the following description and appended claims, taken in conjunction with the accompanying drawings. Understanding that these drawings depict only exemplary embodiments and are, therefore, not to be considered limiting of the disclosure's scope, the exemplary embodiments of the disclosure will be described with additional specificity and detail through use of the accompanying drawings in which:

DETAILED DESCRIPTION

Figure 1:
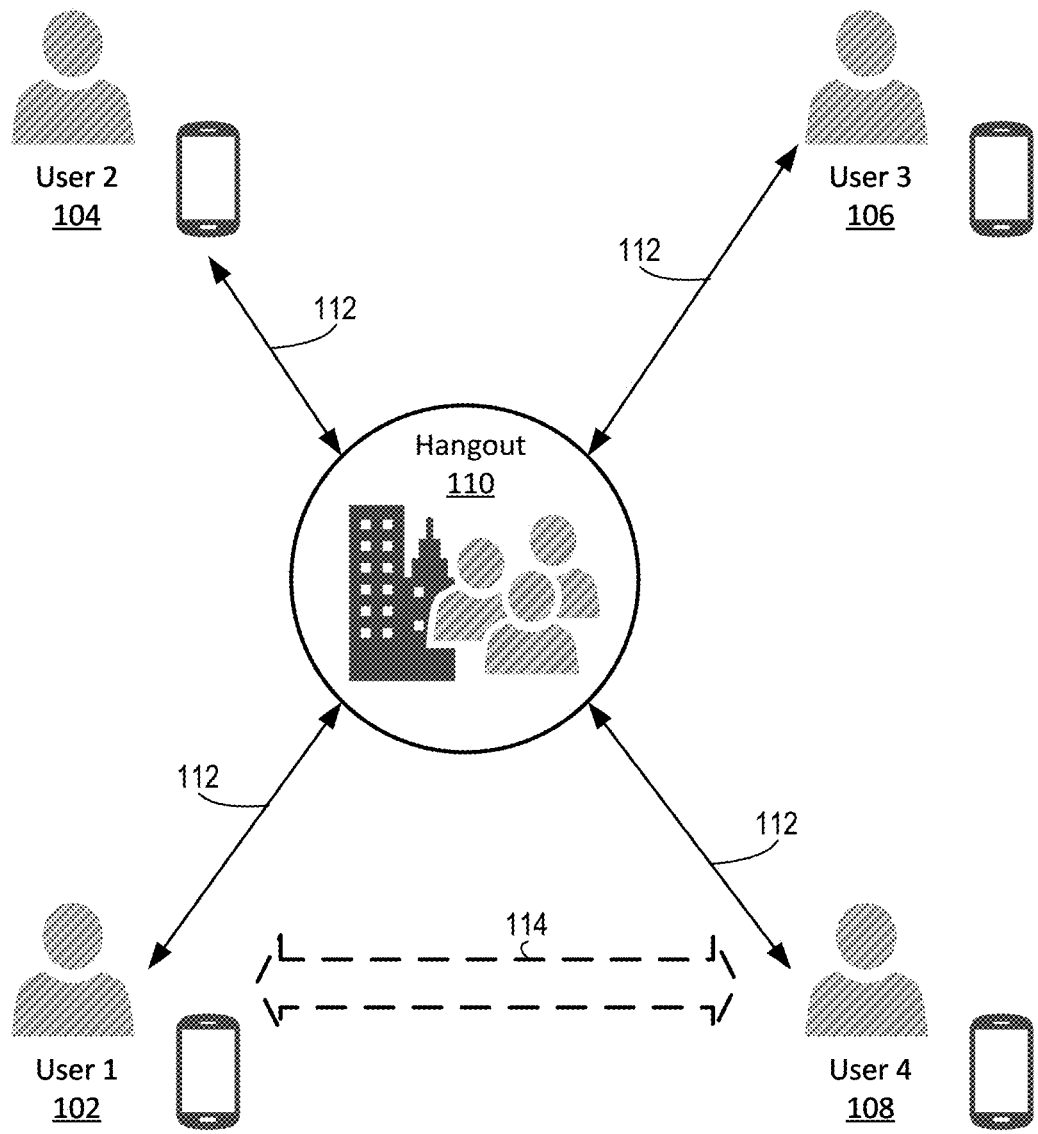
FIG. 1 is a schematic block diagram depicting users that are patrons of a common hangout, according to one embodiment.

Exemplary embodiments of the disclosure will be best understood by reference to the drawings, wherein like parts are designated by like numerals throughout. It will be readily understood that the components, as generally described and illustrated in the FIGS. herein, could be arranged and designed in a wide variety of different configurations. Thus, the following more detailed description of the embodiments of the apparatus, system, and method is not intended to limit the scope of the disclosure but is merely representative of exemplary embodiments.

The phrases "connected to," "coupled to" and "in communication with" refer to any form of interaction between two or more entities, including mechanical, electrical, magnetic, electromagnetic, fluid, audio, video, text, and thermal interaction. Two components may be functionally coupled to each other even though they are not in direct contact with each other.

"Hangout" refers to an establishment, especially for meals, recreation, socializing or entertainment. Examples of a hangout include, but are not limited to a place, a location, an establishment, a business, a facility, a site, a venue, a locale, a meeting place, a park, a residence (e.g., for playing board games or the like), a fitness center, a gathering place, a joint, a club, a bar, a nightclub, a social hall, a church, a sports venue, a sporting event, a shopping mall, an amusement park, or the like. "User" refers to any person that operates a computing device and/or a user interface. "Event" refers to any activity that occurs at a specific time and/or place. In certain embodiments, an event can also have a predefined duration. An event can last a few minutes, hours, or days, weeks, or months.

"Relationship" refers to the way in which two or more concepts, objects, or people are connected or associated, or the state of being connected. "Friendship" refers to a particular kind of relationship between two people or between a person and an organization or entity. Typically, a friendship between two people implies a commitment between the two people to support and help each other through a bond of mutual affection. "Friend" refers to a person whom one knows and with whom one has a bond of mutual affection, typically exclusive of sexual or family relations.

The word "exemplary" is used herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

As mentioned, existing social media platforms are not centered on a single physical location, entity, or hangout. Owners, patrons, fans, followers, and/or hosts of or at a particular place, entity, establishment, or hangout can meet in person in order to form an association or relationship. However, this can be challenging because two patrons may not know anything about the other, except that they are both at the same hangout, at the same time. Consequently, patrons, fans, followers, hosts, and/or Owners at a hangout may be on guard with every person to person encounter at the hangout and such meetings may be awkward and uncomfortable for both parties. The present disclosure provides and apparatus, system, method, and computer program product that facilitates these meetings based on the common ground; the fact that both people have a mutual interest in and/or affinity for a hangout.

FIG. 1 is a schematic block diagram depicting users (e.g., User 1 102, User 2 104, User 3 106, and User 4 108) that are patrons of a common hangout 110, according to one embodiment. Advantageously, each of the users may visit the hangout 110 frequently for food, drink, entertainment, social interaction, to meet new people, and/or to make friends.

Suppose in one example, that User 1 102 is new to an area and has just recently started patronizing the hangout 110. Consequently, User 1 102 may not yet know anyone in the neighborhood or city of the hangout 110 and may not yet know anyone who also visits the hangout 110. In this example, each of the users (e.g., User 1 102, User 2 104, User 3 106, and User 4 108) has a tentative relationship 112 with the hangout 110. "Tentative relationship" refers to a relationship that may be provisional, temporary, uncertain, and/or short lived. a tentative relationship may be one that is subject to one or more conditions, criteria, or requirements being met. Their first impressions and/or experiences at the hangout 110 may be positive and they may be considering forming a stronger relationship with the hangout 110.

While one or more of the users (e.g., User 1 102, User 2 104, User 3 106, and User 4 108) may desire a more permanent relationship with one or more of the others and/or with the hangout 110, without the solutions of the present disclosure, they are left with conventional options for forming these relationships. For example, suppose User 1 102 seeks a friend relationship 114 with User 4 108. As used herein a friend relationship 114 refers to any relationship that is not a tentative relationship 112.

Currently, this friend relationship 114 does not exist (represented by the dashed lines of the double arrow friend relationship 114 symbol). User 1 102 and User 4 108 have not yet met in person and they are quite different from each other. User 1 102 works in the technology industry and enjoys technology related hobbies. User 4 108 is an athlete and big sports fan who enjoys all kinds of sports. Advantageously, the present disclosure provide a means for User 1 102 and User 4 108 to meet and form a relationship, potentially a friend relationship 114.

Figure 2:
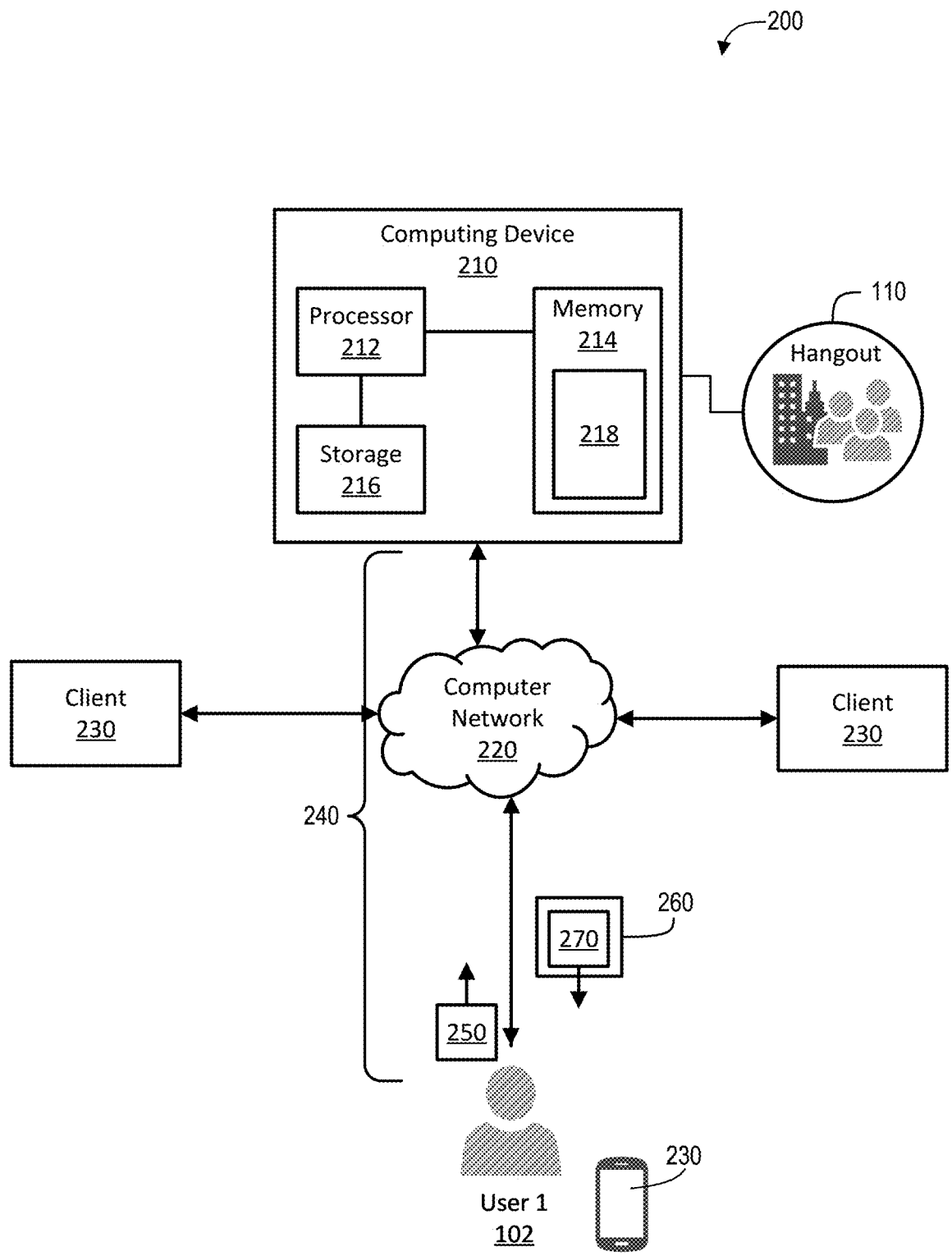
FIG. 2 is a schematic block diagram depicting a system for connecting users by way of a hangout, according to one or more examples of the present disclosure.

FIG. 2 is a schematic block diagram depicting a system 200 for connecting users by way of a hangout 110, according to one or more examples of the present disclosure. In one embodiment, the system 200 may include a computing device 210, a computer network 220, and a plurality of clients 230 that can cooperate to connect users by way of a hangout 110. The system 200 enables two people to form a relationship based on a specific physical location, such as a hangout 110.

In various embodiments, a computing device 210 may refer to any electronic device capable of computing by performing arithmetic or logical operations on electronic data. For example, a computing device 210 may be a server, a workstation, a desktop computer, a laptop computer, a tablet, a smartphone, a control system for another electronic device, a network attached storage device, a block device on a storage area network, a router, a network switch, or the like. In certain embodiments, a computing device 210 may include a non-transitory, computer readable storage medium that stores computer readable instructions configured to cause the computing device 210 to perform steps of one or more of the methods disclosed herein.

In the depicted embodiment, the computing device 210 includes a processor 212, a memory 214, and storage 216. In various embodiments, a processor 212 may refer to any electronic element that carries out the arithmetic or logical operations performed by the computing device. For example, in one embodiment, the processor 212 may be a general-purpose processor that executes stored program code.

"Processor" refers to any circuitry, component, chip, die, package, or module configured to receive, interpret, decode, and execute machine instructions. A processor may refer to any electronic element that carries out the arithmetic or logical operations performed by a computing device. For example, in one embodiment, a processor may be a general-purpose processor that executes stored program code. In another embodiment, a processor may be a field-programmable gate array (FPGA), an application-specific integrated circuit (ASIC), or the like, that operates on data stored by the memory and/or the storage. Examples of a processor may include, but are not limited to, a central processing unit, a general-purpose processor, an application-specific processor, a graphics processing unit (GPU), a field programmable gate array (FPGA), Application Specific Integrated Circuit (ASIC), System on a Chip (SoC), virtual processor, processor core, and the like.

"Volatile memory media" or "memory" refers to any hardware, device, component, element, or circuit configured to maintain an alterable physical characteristic used to represent a binary value of zero or one for which the alterable physical characteristic reverts to a default state that no longer represents the binary value when a primary power source is removed or unless a primary power source is used to refresh the represented binary value. Examples of volatile memory media include but are not limited to dynamic random-access memory (DRAM), static random-access memory (SRAM), double data rate random-access memory (DDR RAM) or other random-access solid-state memory. While the volatile memory media is referred to herein as memory media, in various embodiments, the volatile memory media may more generally be referred to as volatile memory. In certain embodiments, data stored in volatile memory media is addressable at a byte level which means that the data in the volatile memory media is organized into bytes (8 bits) of data that each have a unique address, such as a logical address.

In another embodiment, a processor 212 may be a field-programmable gate array (FPGA), an application-specific integrated circuit (ASIC), or the like, that operates on data stored by the memory 214 and/or the storage 216. In a certain embodiment, a processor 212 may be a server, a webserver, an app server, or the like.

The memory 214, in one embodiment, is coupled to the processor 212 by a memory bus. In certain embodiments, the memory 214 may store data that is directly addressable by the processor 212. In various embodiments, a memory 214 may include one or more types of memory media for storing data, such as dynamic random access memory (DRAM) 132, other memory media types, or the like.

The storage 216, in one embodiment, is coupled to the processor 212 by a storage bus. In certain embodiments, the storage bus may be a peripheral bus of the computing device 210, such as a peripheral component interconnect express (PCI Express or PCIe) bus, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like.

In certain embodiments, the memory 214 includes code 218 executable by the processor 212. In certain embodiments, the code 218 may be configured to implement one or more features, functions, aspects, and/or attributes of the present disclosure. "Code" or "Executable Code" refers to a set of instructions configured for reading and executing by a processor of a computing device. The code may exist in machine-readable and/or human readable formats. Examples of code include binary code, machine code, scripts, compiled code, virtual machine code, and the like. The code may be stored on a computer-readable storage media. "Computer readable storage media" refers to any hardware, device, component, element, or circuit configured to maintain an alterable physical characteristic used to represent a binary value of zero or one either while a primary power source is available or after a primary power source is removed. Computer readable storage media may be used interchangeably herein with the term non-volatile memory media or volatile memory media.

In one embodiment, the system 200 includes one or more clients 230 connected to one or more computing devices 210 through one or more computer networks 220. A client 230 may be a host, a server, a storage controller of a SAN, a workstation, a personal computer, a laptop computer, a handheld computer, a mobile device, a tablet, a smartphone, a supercomputer, a computer cluster, a network switch, router, or appliance, a database or storage appliance, a data acquisition or data capture system, a diagnostic system, a test system, a robot, a portable electronic device, a wireless device, or the like. In another embodiment, the client 230 operates within the computing device 210. The client 230 may be an application, a server, an applet, a thread, a driver, a database management system, a daemon, or the like.

"Network" refers to a collection of two or more computing devices coupled to each other in such a way that the two or more computing devices can exchange requests, responses, and/or messages with each other. The interconnect between the two or more computing devices may be a physical connection, a wireless connection, or a combination of these.

The computer network 220 may include the Internet, a wide area network ("WAN"), a metropolitan area network ("MAN"), a local area network ("LAN"), a token ring, a wireless network, a fiber channel network, a SAN, network attached storage ("NAS"), ESCON, or the like, or any combination of networks. The computer network 220 may also include a network from the IEEE 802 family of network technologies, such Ethernet, token ring, Wi-Fi, WiMax, and the like. The computer network 220 may include servers, switches, routers, cabling, radios, and other equipment used to facilitate networking computing devices 210 and clients 230. In one embodiment, the system 100 includes multiple computing devices 210 that communicate as peers over a computer network 220. One of skill in the art will recognize other computer networks 220 comprising one or more computer networks 220 and related equipment with single or redundant connections between one or more clients 230.

Advantageously, the system 200 enables User 1 102 to connect with other users by way of a hangout 110. In the illustrated embodiment, User 1 102 may operate a client 230 and initiate a communication session 240 with the computing device 210.

"Communication session" refers to a set of communication messages and/or responses between a sender and a receiver from an initiation event to a termination event. The messages and responses may travel over any communication medium included wired and/or wireless interconnects. The communication session may exchange messages and responses in a synchronous or an asynchronous manner. Generally, a sender initiates a communication session and either the sender or the receiver can terminate the communication session. In certain embodiments, the communication session is conducted using electronic messages and/or signals and/or computing devices.

Initially, User 1 102 may have no relationships with any hangouts. In certain examples, User 1 102 may start by determining what hangouts are available. In one embodiment, User 1 102 can do this by making a search query 250. In one embodiment, the search query 250 can be initiated by User 1 102 operating a user interface of a client 230. In another embodiment, the search query 250 can be initiated automatically when the client 230 starts up. The client 230 establishes a communication session 240 with the computing device 210 and the search query 250 is sent from the client 230 to the computing device 210.

The computing device 210 receives the search query 250, services the search query 250, and returns a response 260. In certain embodiments, the response 260 can include one or more hangout summaries 270

"Search query" refers to a request to obtain data and/or information based on one or more criteria. In certain embodiments, a search query may be initiated by a user and may include criteria provided using user input. A search query generally results in a response message to the user or entity that initiated the search query. The response message may include results that satisfy the criteria of the search query or an empty result set if no criteria satisfy the search query. "Hangout summary" refers to any data or information about a hangout that facilitates identifying, locating, interacting with, and/or contacting a hangout. As an example, a hangout summary can provide basic generally information about a hangout in brief format that includes just the most important information. As another example, a hangout summary can include an icon that identifies a location of a hangout on a map.

"User interface" refers to component, module, device, system, software, hardware, or apparatus that enables one or more people to provide user input, communicate, and/or interact with an electronic or computing device using mechanical, electronical, manual, audio, visual, or tactile input. In one example, a user interface may refer to one or more mechanical, electrical, or electromechanical structures that interact with, or enable, a user to provide user input, instructions, input signals, data, or data values and receive output, output data, or feedback. "User" refers to any person that operates a computing device and/or a user interface. "User input" refers to a form of input data that is provided directly or indirectly by a user, operator, or beneficiary of an apparatus, module, system, method, or process. User input can be provided by a variety of input devices and can include any indicator or indication of input data from the user. A variety of signals, indicators, indications, gestures, movements, touches, keystrokes, or the like can serve as user input. As used herein, an "indicator" refers to an apparatus, device, component, system, assembly, mechanism, hardware, software, firmware, circuit, module, set of data, text, number, code, symbol, a mark, or logic structured, organized, configured, programmed, designed, arranged, or engineered to convey information or indicate a state, condition, mode, context, location, or position to another apparatus, device, component, system, assembly, mechanism, hardware, software, firmware, circuit, module, and/or a user of an apparatus, device, component, system, assembly, mechanism, hardware, software, firmware, circuit, module that includes, or is associated with the indicator. The indicator can include one or more of an audible signal, a token, a presence of a signal, an absence of a signal, a tactile signal, a visual signal or indication, a visual marker, a visual icon, a visual symbol, a visual code, a visual mark, and/or the like. In certain embodiments, "indicator" can be with a an adjective describing the indicator. For example, a "mode indicator" is an indicator that identifies or indicates a mode.

Those of skill in the art appreciate that the search query 250 may take a variety of forms and/or formats, each of with is within the scope of the present disclosure. In one embodiment, the search query 250 can be a zip code, a physical address, a unique geographic location identifier, or the like. The search query 250 can be a specific and/or unique geographic location identifier. For example, the search query 250 can be specific physical address. Or, search query 250 can be a starting point for a search of a geographic area. For example, the search query 250 can be a search within a specific radius of an initial starting geographic point. For example, the search query 250 can be a configured to automatically search within a predefined geographic area (e.g., 3 mile radius) of a current location of User 1 102. Such a search query 250 can be referred to herein as a geographic search query.

"Predefined geographic area" refers to a physical area on the earth having a size and/or shape that is predefined. In certain embodiments, a predefined geographic area may be measured as a circle that extends for a predefined radius out from a user. "Geographic search query" refers to a search query for which the criteria of the search query includes at least some geographic area. In one embodiment, the geographic area may be a geographic area within a predefined radius of a user.

In certain embodiments, a hangout 110 is a physical establishment. In one embodiment, a hangout 110 is a private hangout set up for a particular purpose and/or for a limited time. For example, suppose a user may want to establish their residence as a hangout 110 for the purpose of gathering friends for a special event such as an anniversary or a party. In one embodiment, the system 200 supports management of a private hangout. A private hangout is one that can only be accessed if the owner of the hangout authorizes another user to become a follower and/or friend of the private hangout. The private hangout may function similar to other hangouts 110 described herein, except that the private hangout may not be included in results of a search query 250 and is hidden from users of the system 200. Only the owner and users who the owner authorizes can view and interact with a private hangout.

Figure 3:
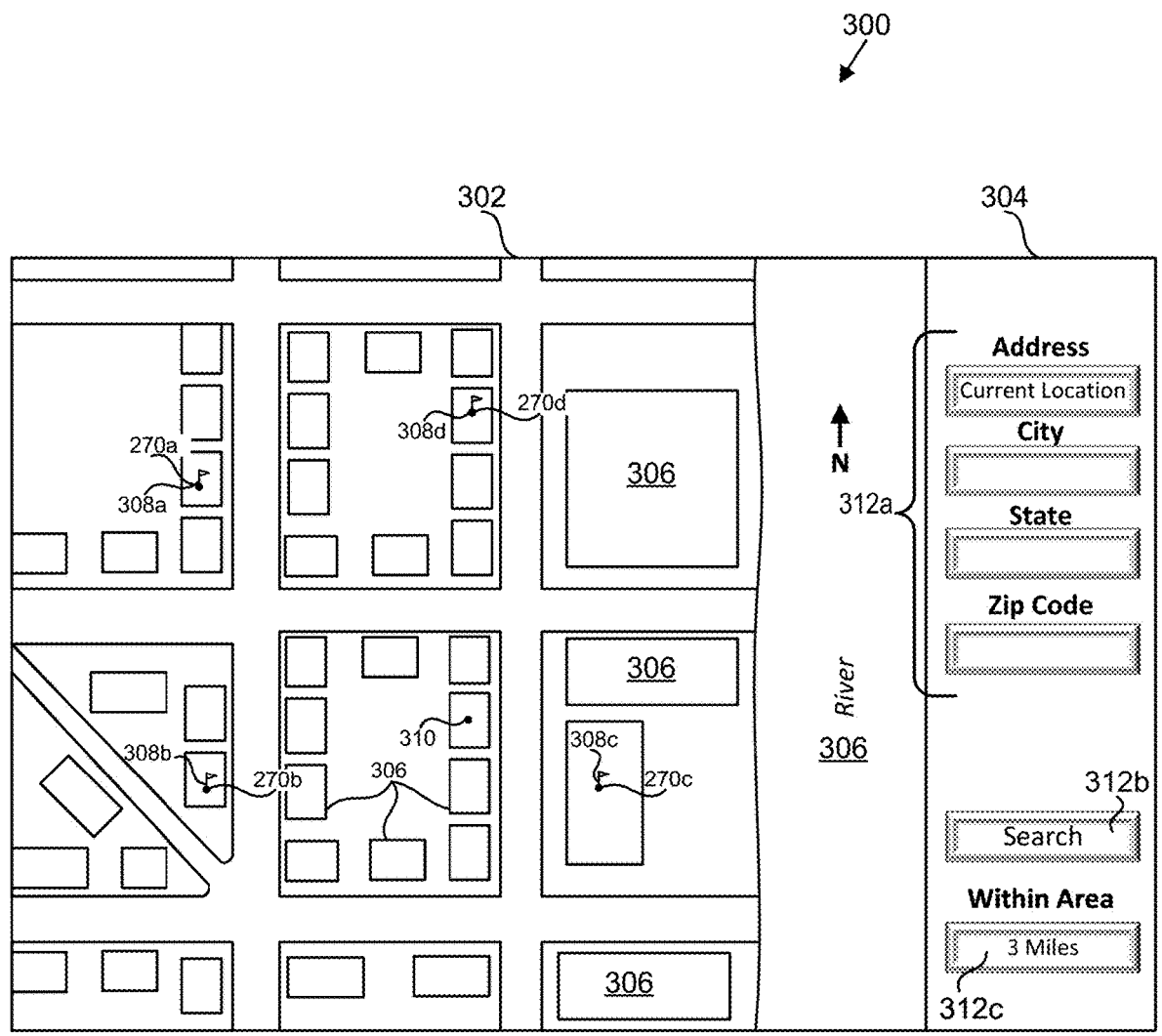
FIG. 3 depicts an example user interface that presents a map of hangouts, according to one or more examples of the present disclosure.

FIG. 3 depicts an example user interface 300 that presents a map of hangouts, according to one or more examples of the present disclosure. In one embodiment, the user interface 300 may be presented to a user (e.g., User 1 102) in response to a search query 250. For example, if the client 230 is configured to automatically send a search query 250 to the computing device 210 when the User 1 102 starts up the client 230 and has no relationships with any hangouts, the user interface 300 may be presented with the results of that automated search query 250.

The user interface 300 may include a map pane 302 and a user input pane 304. The map pane 302 can display, or otherwise present, a graphical representation a map of a geographic area. The map pane 302 supports conventional features such as zoom in and zoom out to enable a user to navigate the depicted map.

The map can include graphical representations, images, or icons that represent items 306 in the geographic area represented on the map. For example, the map may include roads, buildings, water features, parks, landmarks, and the like. Certain objects on the map may be marked with labels, icons, or another identifier or indicator identifying the building or location as the location of a particular hangout 110. In addition, certain items 306 may have a physical address associated with them such that the physical address can be used by the client 230 and/or computing device 210 as needed.

In one embodiment, the computing device 210 can include a repository that stores information about hangouts 110 known to or registered with the system 200. "Repository" refers to any data source or dataset that includes data or content. In one embodiment, a repository resides on a computing device. In another embodiment, a repository resides on a remote computing or remote storage device. A repository may comprise a file, a folder, a directory, a set of files, a set of folders, a set of directories, a database, an application, a software application, content of a text, content of an email, content of a calendar entry, and the like. A repository, in one embodiment, comprises unstructured data. A repository, in one embodiment, comprises structured data such as a table, an array, a queue, a look up table, a hash table, a heap, a stack, or the like. A repository may store data in any format including binary, text, encrypted, unencrypted, a proprietary format, or the like.

The repository may include record of a plurality of hangouts 110. Each record may include data about the hangout, including a physical address for each hangout. These records may include hangouts 110 that are registered with the system 200.

In one embodiment, in response to a search query 250, the code 218 may retrieve a set of records of hangouts (also referred to as a set of hangouts) that satisfy the search query 250. This set of hangouts can be used to determine one or more hangout summaries 270 that are provided in the response 260. In the illustrated embodiment, the map pane 302 may include icons 308 that serve as indicators of where hangouts registered in the system 200 are physically located within a predefined geographic area. In this manner, the icons 308 can serve as hangout summaries 270. In addition to graphical symbols, the icons 308 can include labels that include the name of the identified hangout 110. A user can select one of the icons 308 to get more information about the hangout 110 that is at that location.

In addition to icons 308 that can serve as a hangout summary 270, the map pane 302 can include other business icons 310 that identify the locations of businesses or entities or other locations that can be registered with the system 200 as hangouts 110. The business icons 310 may also include labels or graphics that identify the business or entity at the location.

The user input pane 304 can include one or more controls 312 that enable a user to modify a search query 250 or submit a new search query 250 based on the hangout summaries 270 presented in the map pane 302. Controls 312a enable a user to defined location parameters like an address, a city, a state, and/or a zip code for the search query 250. Control 312b may signal when a user is ready to submit the search query 250. Control 312c may identify a radius from the location provided using control 312a that is to be used in the search query 250. In response to a submitted search query 250 the user interface 300 may be refreshed to show a new set of results (hangout summaries 270).

Figure 4:
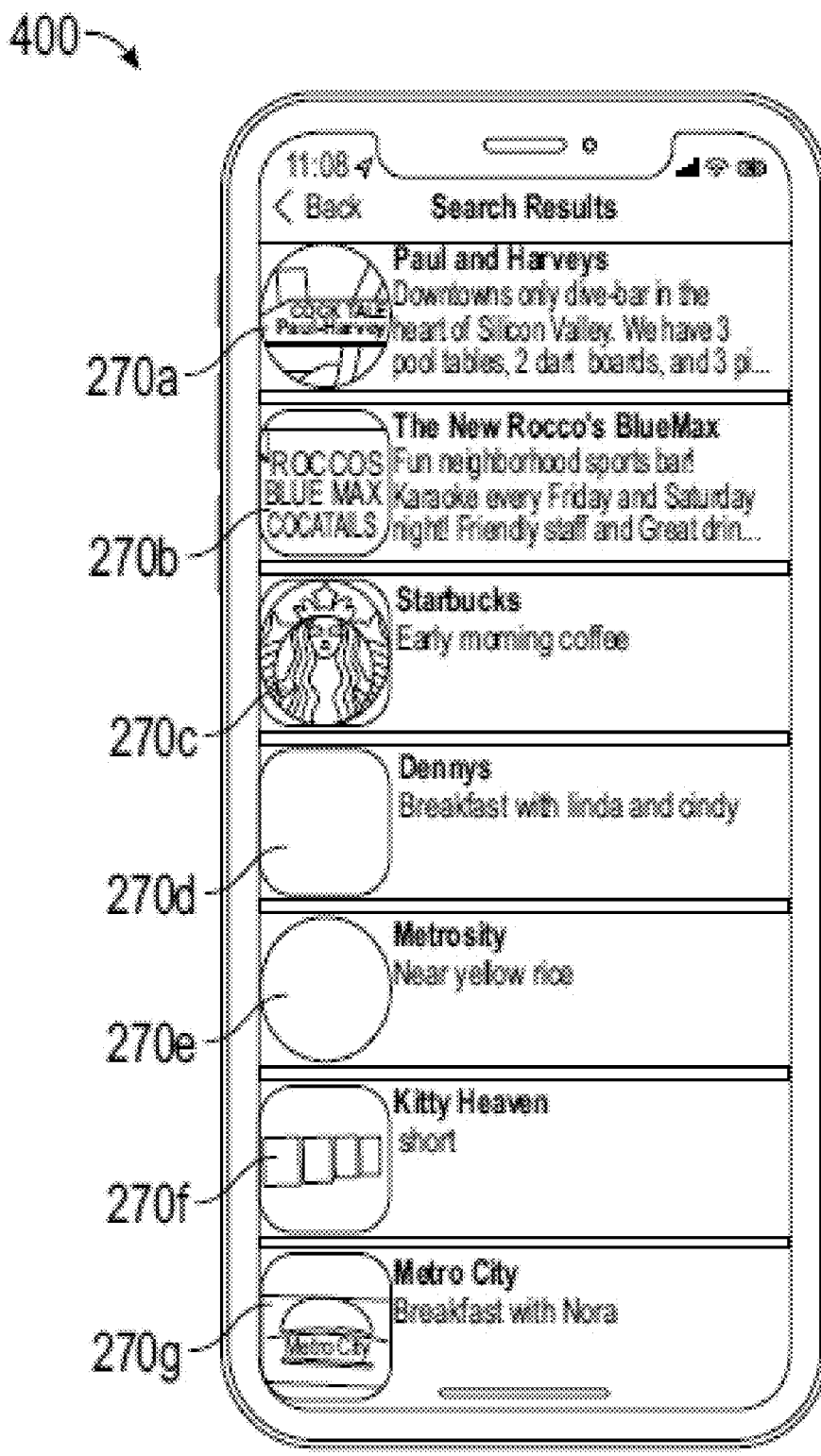
FIG. 4 depicts an example user interface that presents hangout summaries, according to one or more examples of the present disclosure.

The user interface 300 is one example of how the system 200 can present a plurality of hangout summaries 270 for a plurality of hangouts 110 within a predefined geographic area in response to a geographic search query 250 from a user. FIG. 4 depicts another example user interface 400 that presents hangout summaries 270, according to one or more examples of the present disclosure. In FIG. 4, the hangout summaries 270 may be displayed in a list format. The order of the list may be predefined and may be in order of the closest hangout to the current location of the user or location used in the search query 250 or another order determined by the user.

In the user interface 400, each hangout summary 270 may include a title or label, a logo, graphic, or icon, and/or a brief description of the hangout. In the illustrated embodiment, the user interface 400 includes seven different hangout summaries 270 for seven associated hangouts 110 that are registered with the system 200.

Figure 5:
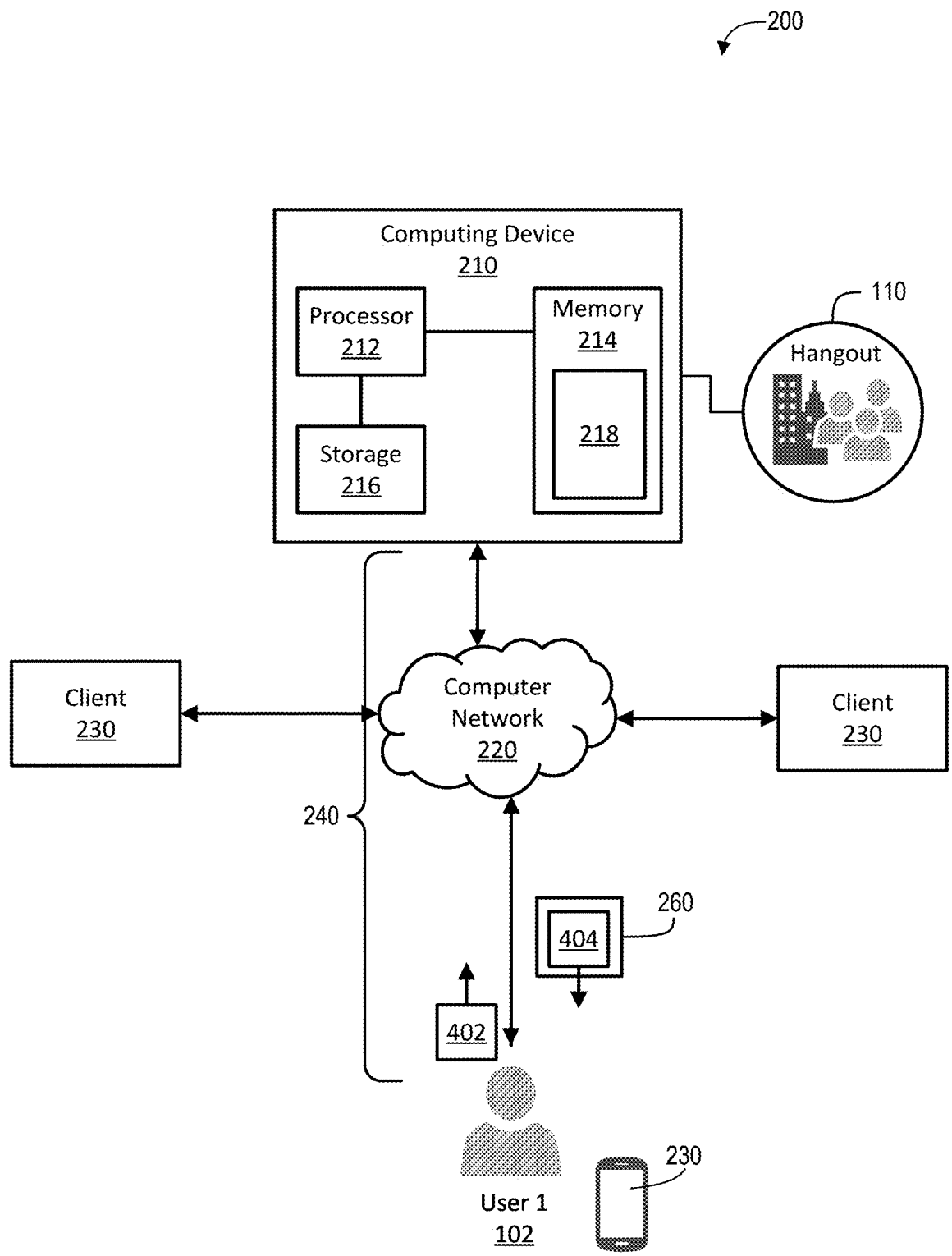
FIG. 5 is a schematic block diagram depicting a system for connecting users by way of a hangout, according to one or more examples of the present disclosure.

FIG. 5 is a schematic block diagram depicting a system for connecting users by way of a hangout, according to one or more examples of the present disclosure. Once a user has browsed one or more hangout summaries 270, the user (e.g., User 1 102) can determine a hangout 110 that they would like to know more about. When a user (e.g., User 1 102) identifies a hangout 110 they want to know more about they can select the hangout summary 270 for that hangout. In one embodiment, the user may simply touch or select the hangout summary 270. Selecting a hangout summary 270 may designate the associated hangout 110 as a selected hangout.

In response to selecting a hangout summary 270, the client 230 may generate and send a hangout details request 402. "Hangout details request" refers to any request for information, details, data, or hangout details about, or for, one or more hangouts. The request can take a variety of forms or formats, including but not limited to a signal, a message, a data packet, an HTTP request, an Application Program Interface (API) request, or the like. "Hangout details" refers to data or information that describes aspects, attributes, characteristics, features, functions, events, and the like in relation to a hangout. Examples of hangout details may include, times and dates when the hangout is open and available for patrons to visit, directions for how to navigate to the hangout, an address for the hangout, a contact phone number or social medial identifier, information about employees currently present at the hangout, information about patrons and/or followers currently present at the hangout, news information about the hangout, event information about the hangout, and the like.

In response to the hangout details request 402, the computing device 210 may retrieve, gather, collect, and/or generate hangout details 404. The computing device 210 may send the hangout details 404 to the client 230 in the response 260. The hangout details 404 are associated with one or more of selected hangout summaries 270.

In certain embodiments, the hangout details request 402 may include a set of selected hangout summaries 270 for a corresponding set of hangouts 110. In such an embodiment, the computing device 210 may respond to the hangout details request 402 by including a set of hangout details 404 that includes one set of hangout details 404 for each hangout 110 of the set of selected hangout summaries 270.

Figure 6:
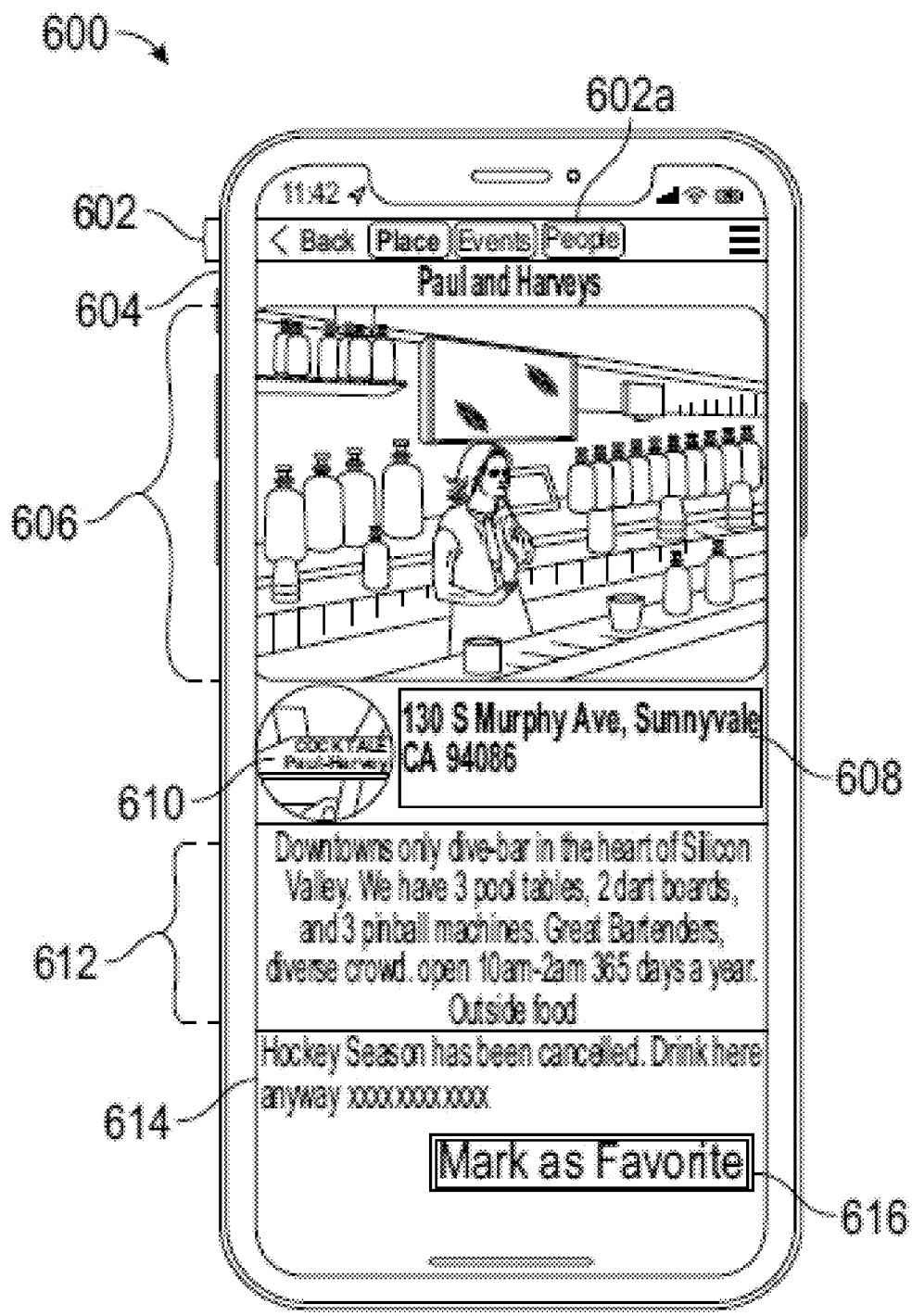
FIG. 6 depicts an example user interface that presents hangout details, according to one or more examples of the present disclosure.

FIG. 6 depicts an example user interface 600 that presents hangout details 404 for a single hangout 110, according to one or more examples of the present disclosure. The user interface 600 can have a variety of information and formats and may present certain parts of or all of the hangout details 404. In the illustrated embodiment, the user interface 400 includes a set of navigation controls 602, a title 604, an image 606, an address 608, a logo or icon 610, a long description 612, and/or a news post 614. This data and information can help a user decide if they want to visit the hangout 110 and/or if they want to form a relationship or association with the hangout 110.

The user interface 600 of FIG. 6 illustrates a set of hangout details 404 for a single hangout 110. Alternatively, or in addition, the user interface 600 can share hangout details 404 for two or more hangout 110 as well. For example, the user interface 600 may include a swipe interface that enables a user to swipe left or right on the screen to review hangout details 404 about another hangout 110.

In the illustrated embodiment, the navigation controls 602 include a tab for a "place" that displays certain hangout details 404. In addition, activation of another tab (e.g., "Events") may cause the user interface 600 to present information about events scheduled at the hangout 110. Similarly, activation of another tab (e.g., "People") may cause the user interface 600 to present information about people associated with, connected with, or having a relationship to the hangout 110.

If a user decides they want to form a relationship, connection, or association with the hangout 110 associated with the presented hangout details 404, a user may activate the "Mark as Favorite" button 616, in one example. Such an action may indicate that the user has selected the hangout 110 and desires to form a relationship. In response to activation of the "Mark as Favorite" button 616, the client 230 and/or the computing device 210 records that the user wants to keep track of, remember, review, and/or follow the hangout 110 associated with the presented hangout details 404. For example in one embodiment, the client 230 may create a "favorites" list and add the selected hangout 110 to that list. The "favorites" list can serve as a short cut or quick reference tool for a user to find the same hangout 110 later. Said another way, by activating the "Mark as Favorite" button 616, are user indicates that they "Like" the hangout 110 and want to form a relationship with the hangout 110. The relationship desired may be one of a friend, a supporter, a follower, or the like.

Figure 7:
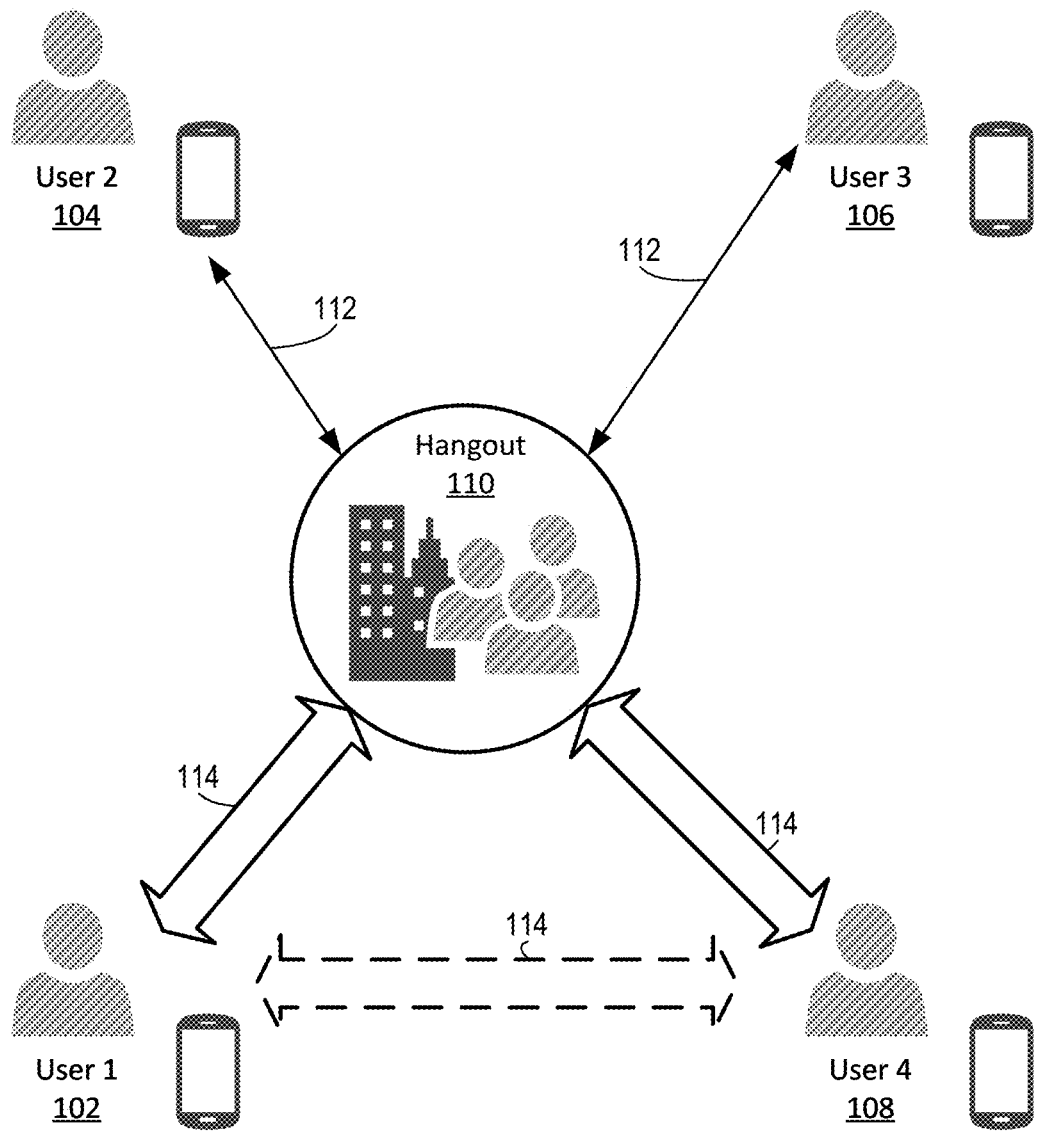
FIG. 7 is a schematic block diagram depicting two users with a relationship to a common hangout, according to one embodiment.

Referring to FIG. 7, when a user (e.g., User 1 102) activates the "Mark as Favorite" button 616, or otherwise provides an indication of a desire for a more permanent relationship between the user and the hangout 110, the relationship between the user and the hangout 110 changes. For example, the relationship can change from a tentative relationship 112 (See FIG. 2) to a more permanent relationship such as that of friend relationship 114. In such a friend relationship 114 the user may be considered a follower, a fan, or a supporter. Thus, in certain aspects of the present disclosure, a friend relationship 114 can also be referred to as a follower relationship. In this manner, a user can request a relationship with a selected hangout 110.

"Follower" refers to a person who indicates an interest in, support for, or affection towards, another person, organization, idea, or entity. Often a follower is one who would like to keep informed of events, activities, facts, news, and/or circumstances about the person, organization, idea, or entity that they follow. A follower may also be considered a friend of the person, entity, or organization that they are following.

In a manner similar to, or the same as, that described in relation to FIGS. 2-6, a user (e.g., User 1 102) can convert a tentative relationship 112 to a friend relationship 114. Similarly, other users (e.g., User 4 108) may convert their tentative relationship 112 to a friend relationship 114. In certain embodiments of the present disclosure, once a user forms a friend relationship 114 with the hangout 110, the user can access a variety of additional features and/or functionality. It should be noted that while User 1 102 and User 4 108 each have a friend relationship 114 with the same, or a common, hangout 110, these users do not have a friend relationship 114 with each other. Advantageously, the present disclosure enables these two users to form such a friendship.

In certain embodiments, the system 200 protects the privacy and anonymity of users who have a tentative relationship 112 and/or a friend relationship 114 with the hangout 110. For example, users with a tentative relationship 112 may be restricted from seeing any information about other users until such users have a more permanent relationship, such as a friend relationship 114 with the hangout 110. Even when a user has a friend relationship 114, the amount information and level of detail can be controlled by the other users such that only the desired information is available to a user with a friend relationship 114 with the hangout 110.

Figure 8:
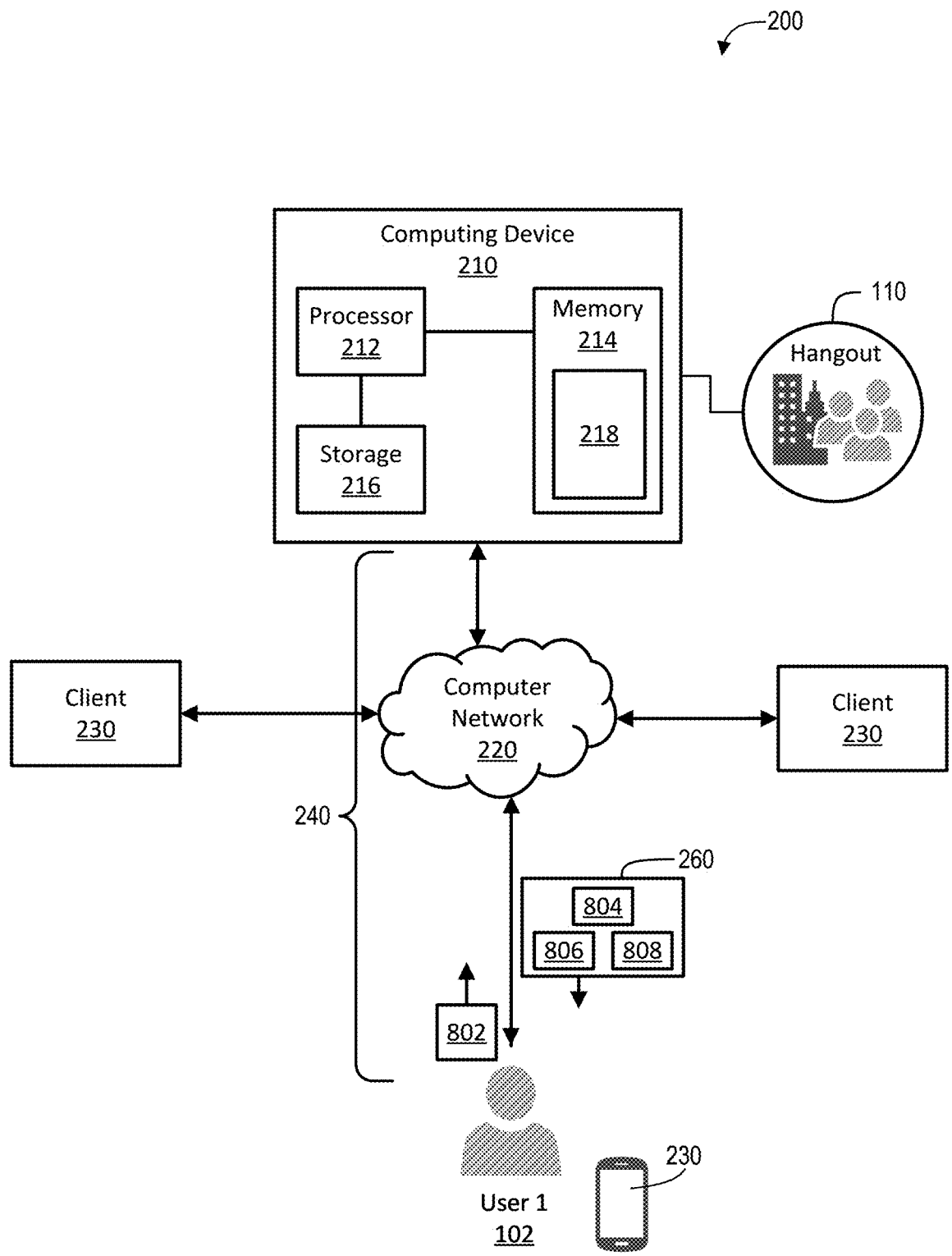
FIG. 8 is a schematic block diagram depicting a system for connecting users by way of a hangout, according to one or more examples of the present disclosure.

Referring now to FIG. 8, a user (e.g., User 1 102) can now form friendships with other users/followers of the hangout 110. This is, at least in part, because the user has a friend relationship 114 with the hangout 110. In one example, User 1 102 may request follower data from the computing device 210 by sending a user request 802. "User request" refers to any request made by a user. Often the user request is made using a user interface and includes user input. Alternatively, or in addition, the client 230 and/or computing device 210 may present or provide follower data 804 to the user automatically without having received a user request 802 for follower data 804. In one embodiment referring to FIG. 6, the user may initiate the user request 802 by selecting a navigation control 602a on the user interface 600 marked "People."

In response to the user request 802, the computing device 210 may send a response 260 that includes one or more of follower data 804, follower details 806, and/or follower presence data 808.

"Follower data" refers to data about, for, or in connection with a follower associated with a hangout. For example, a name of a follower, a icon or image associated with the follower, or a listing of followers are examples of follower data. "Follower details" refers to data or information that describes aspects, attributes, characteristics, features, interests, and the like in relation to a follower. Examples of follower details may include, name, picture, physical characteristics, age, gender, a contact phone number or social medial identifier, an email address, and the like. In certain embodiments, follower details 806 is more specific and more detailed and provides more unique information about a follower than follower data 804. In contrast, follower data 804 may include more generic information about a follower 902. "Follower presence data" refers to data, information, or indicator about, for, or in connection with a follower that indicates that the follower is present at a specific geographic location. Examples of follower presence data include, but are not limited to, an icon, an emoji, a message, a signal, an email, a text, an audio signal, a button, a user interface component, or the like.

Figure 9:
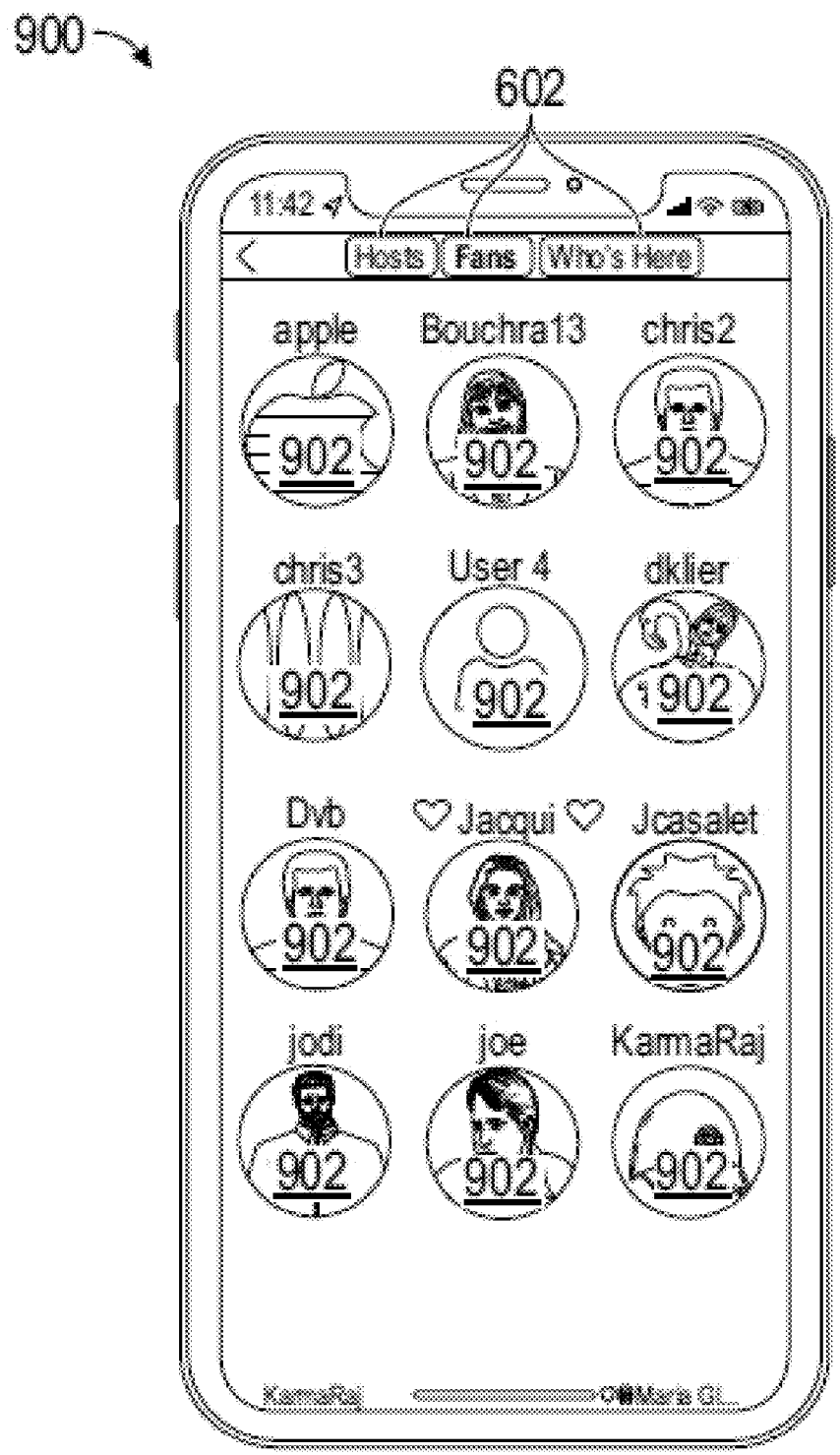
FIG. 9 depicts an example user interface that presents followers, according to one or more examples of the present disclosure.

FIG. 9 depicts an example user interface 900 that presents one or more of follower data 804, follower details 806, and/or follower presence data 808 according to one or more examples of the present disclosure. In the illustrated embodiment, the user interface 900 may default to displaying or presenting a list of followers 902 (also referred to herein as "fans") in a tile or grid pattern layout. In certain embodiments, a follower 902 may have one or more relationships with the hangout 110. For example, a follower 902 may be a host at a hangout 110, an owner of the hangout 110, a patron of the hangout 110, an employee at the hangout 110, and/or a user. "Host" refers to a person who works at, or for, an organization, such as a company and performs one or more hosting services. Examples of a host include, but are not limited to, a bar tender, a waiter, a waitress, a disc jockey, a master of ceremonies, a performer, a shop keeper, a clerk, or the like. "Owner" refers to a person who owns, co-owns, an organization, such as a company. Often an owner has legal right to the ownership of the organization. Examples of an owner include, but are not limited to, a sole proprietor, member, member owner, partner, associate, shareholder, chief executive officer, manager, president or the like. "Patron" refers to a person who regularly attends a business, location, place, establishment, or organization. Patron can refer to a friend, fan, attendee, customer, and/or advocate for the business, location, place, establishment, or organization. "Employee" refers to a person who works at, or for, an organization, such as a company. Advantageously in certain embodiments as described herein, as a user may have a friend relationship 114 with a hangout 110, so too may a user have a friend relationship 114 with a host at the hangout 110, an owner of the hangout 110, a patron of the hangout 110, an employee at the hangout 110, etc.

Advantageously in certain embodiments, each follower 902 has a friend relationship 114 with the hangout 110. Alternatively, or in addition, the list of followers 902 may be presented in response to a user activating one of the navigation controls 602, for example a "Fans" tab.

The follower data 804 associated with each follower 902 may include a name, handle, username or other unique identifier for a follower 902, an image, avatar, or icon associated with the follower 902, and/or a brief description which may be prepared by the follower 902. A user may scroll through the list and find a follower 902 that they may want to connect with, form a friendship. It should be noted that that list of followers 902 includes User 4 108 only because User 4 108 has a friend relationship 114 with the hangout 110. In addition, a user, such as User 1 102 can not access a list of followers 902, if User 1 102 does not have a friend relationship 114 with the hangout 110. In certain embodiments, the follower data 804 can only be presented to a user that has a friend relationship 114 with the hangout 110. In certain embodiments, each of the followers 902 has a friend relationship 114 with the hangout 110.

Figure 10A:
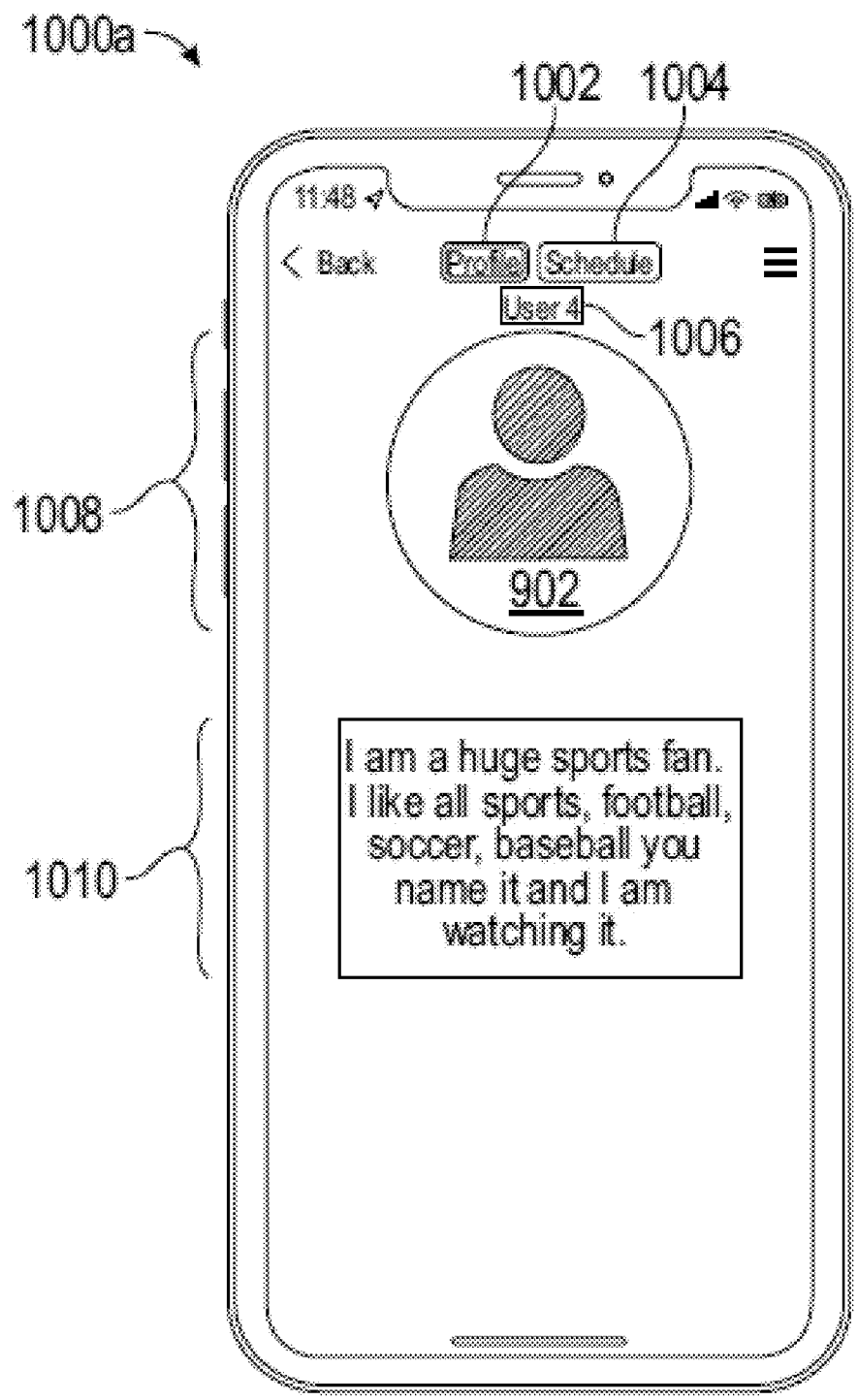
FIG. 10A depicts an example user interface that presents follower details, according to one or more examples of the present disclosure.

From the list of followers 902, a user (e.g., User 1 102) can select a user to learn more details or information about that user. FIG. 10A depicts an example user interface that presents follower details, according to one or more examples of the present disclosure. Suppose a user using user interface 900 selects User 4 (e.g., by tapping on an icon representing User 4) to learn more details about them (e.g., to see the follower details 806 about this follower 902). The client 230 may send the user request 802 to the computing device 210 and display the response (e.g., follower details 806) in user interface 1000a.

The user interface 1000a may include one or more tabs such as a profile tab 1002 and a schedule tab 1004, a username 1006, an avatar 1008, and/or a description 1010. The profile tab 1002 provided follower details 806 about a specific follower 902.

The username 1006 may be a unique identifier for this follower 902. Alternatively, or in addition, the username 1006 may not be unique to a particular follower 902. The username 1006 may be an actual name for a follower 902 or the username 1006 may be a fictitious name. The avatar 1008 may be any design, logo, icon, image, artwork, scene, or image. In certain embodiments, the avatar 1008 may be a photo of the follower 902. Use of photos for the avatar 1008 can be advantageous in that the photo can facilitate one follower 902 finding another for an in person meet up at the hangout 110. In certain embodiments, a photo of the follower 902 may be required for the avatar 1008.

The description 1010 includes follower details about a specific follower 902 (e.g., User 4). In one embodiment, the description 1010 is defined by the follower 902. Alternatively, or in addition, the description 1010 may be augmented by an owner of the hangout 110 and/or by other followers 902 of the hangout 110. In certain embodiments, the description 1010 may include a popularity indicator (not shown), such as stars or a like count that is incremented using or more metrics (e.g., how frequently the follower 902 visits the hangout 110, popularity votes from other followers 902, or the like). As with follower data, in certain embodiments, follower details may be restricted to only users who are associated with the hangout 110. Alternatively, or in addition, even if a user or a follower 902 is associated with the hangout 110 a follower 902 may be able to determine whether or not follower details are available to other followers 902.

The schedule tab 1004 may provide additional follower details. For example, the schedule tab 1004 may indicate what times and/or days a particular follower 902 will be at the hangout 110. The follower 902 may be an employee, host, or owner of the hangout 110 and thus may come at particular times and on particular days. The follower 902 may visit the hangout 110 to complete a work shift or assignment and the schedule for those visits may change from time to time. "Work shift" refers to a period of time on one or more days during which a user, often an employee, is assigned to be at their position or post performing their assigned duties.

Figure 10B:
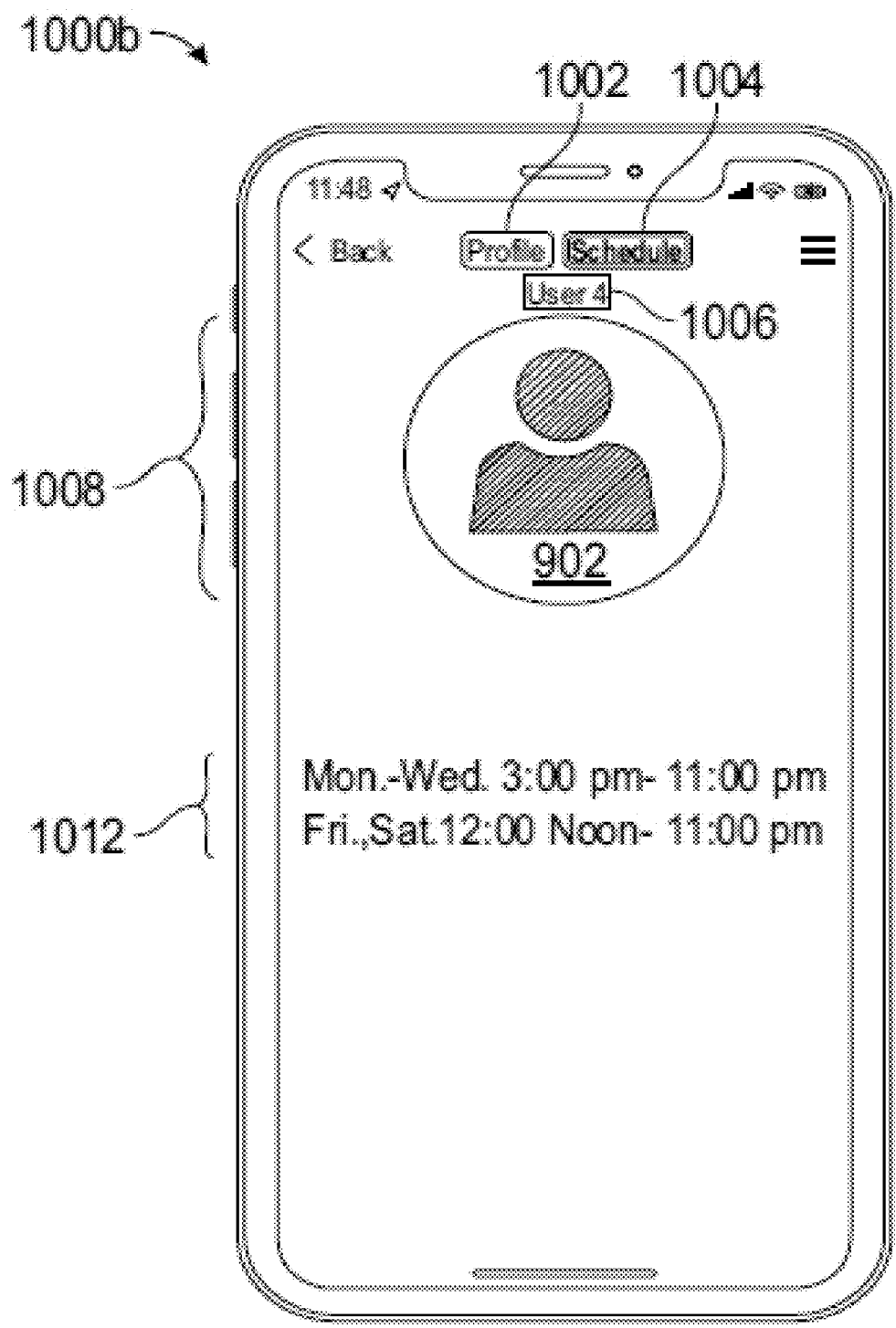
FIG. 10B depicts an example user interface that presents follower details, according to one or more examples of the present disclosure.

In one embodiment referring to FIGS. 10A-10B, the user may initiate a user request 802 by selecting the schedule tab 1004 navigation control on the user interface 1000*a* marked "schedule." In response, the computing device 210 and client 230 may cooperate to present the user interface 1000*b* of FIG. 10B. The user interface 1000*b* may include the same follower details as user interface 1000*a* except that the description 1010 may be replaced with a schedule 1012 that indicates when this follower 902 will be at the hangout 110.

Figure 11:
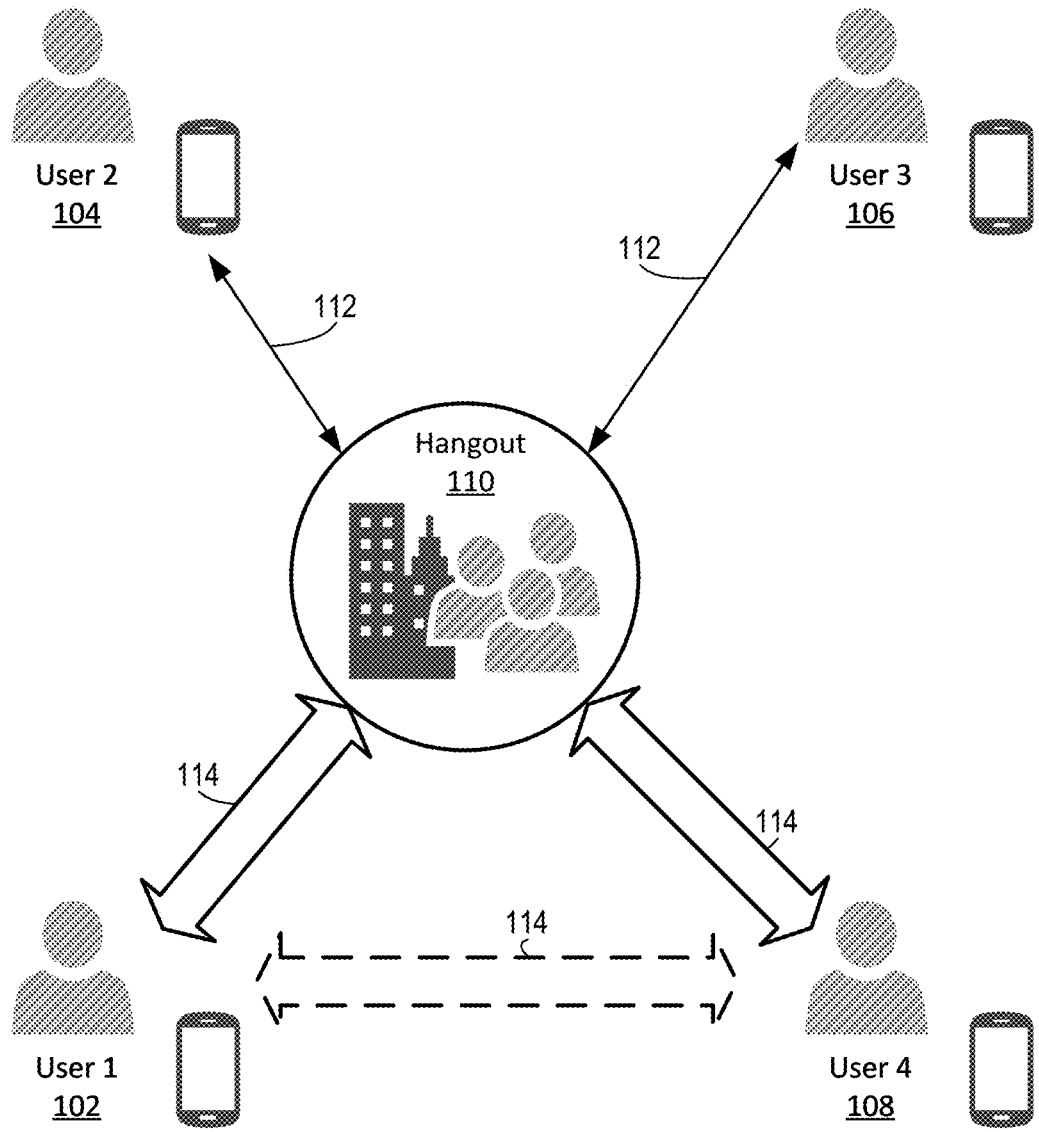
FIG. 11 is a schematic block diagram depicting two users that communicate using an apparatus according to one or more examples of the present disclosure.

FIG. 11 is a schematic block diagram depicting two users that communicate using an apparatus according to one or more examples of the present disclosure. Advantageously, the User 1 102 can use the system 200 to establish a friend relationship 114 with User 4 108. FIG. 11 illustrates that this friend relationship 114 does not yet exist (represented by the dashed lines of the double arrow friend relationship 114 symbol). User 1 102 and User 4 108 have not yet met in person or formed a friend relationship 114 virtually and they are very different from each other. However, User 1 102 and User 4 108 each have a friend relationship 114 (e.g., or are associated) with the same hangout 110.

In certain embodiments, the system 200 is configured to broker a friend relationship 114 (e.g., a friendship) between User 1 102 and User 4 108. The system 200 can broker the friend relationship 114 because both User 1 102 and User 4 108 have a friend relationship 114 with the same hangout 110. The system 200 can broker friend relationships 114 that are formed by meeting in person or are formed by way of a communication session between users who also have a friend relationship 114 with a common hangout 110. Advantageously, the system 200 mediates the communication session between the users.

In certain embodiments, the system 200 can broker a friendship between two users who have a tentative relationship 112 with a common hangout 110. The friendship can be brokered by enabling the two users to communicate information to each other such that they can meet in person at the hangout 110. Alternatively, or in addition, the friendship can be brokered by enabling the two users to communicate information to each other such that they can form a friendship virtually. In certain embodiments, establishing a friendship virtually may not be permitted until the users provide proof that they have met in person first.

In certain embodiments, the system 200 can broker a friendship between two users in response to one user requesting follower presence data about another user. Such a feature can be advantageous because the system 200 may not continue to broker a friendship or permit communication sessions between two users, if one of the users is not present. This feature may encourage users to meet face-to-face.

In one embodiment, the communication session is an asynchronous messaging system such as text based chat messages. These messages may be exchanged between one or more users of the system 200, one or more followers or friends of a hangout 110, or the like. In one embodiment, the communication session may be limited to simple text chat messages to encourage the users of the system 200 to meet in person rather than using the system 200 to communicate. Said another way, the communication session mediated by the system 200 may be exclusively an asynchronous communication session.

Alternatively, or in addition, the system 200 may support other forms of messaging including synchronous communications such as phone calls, video calls, or the like and/or may support messages that include photos, images, and/or video clips. However, certain embodiments may intentionally not include support for other forms of messaging beyond a basic exchange of text messages and/or friend requests (see below). The system 200 may support only a limited text based asynchronous communication session because the system 200 may instead seek to encourage users to interact at the hangout 110 in person.

In certain embodiments, the mediated communication session may be between users who are all users of the same system 200 and have a friend relationship 114 with a common hangout 110 or are followers of a common hangout 110. In another embodiment, a user of the system 200 may have a set of other users of the system 200 that the user considers friends. The system 200 may mediate communication sessions between these friends, however, the amount of data shared with users who are not friends of the hangout 110 may be limited to advertising about the hangout 110. (e.g. follower presence data may not be available to these friends)

Alternatively, or in addition, the system 200 may mediate communication sessions between a user of the system 200 and friends of the user who do not use the system 200 and/or patronize a common hangout 110. Here again the amount of data shared with users who are not users of the system 200 may be more limited, such as to advertising about the hangout 110 and possibly an indicator that the sender has a friend relationship 114 with the hangout 110. (e.g. follower presence data may not be available to these friends) In this manner, the friend relationship 114 of the sender with the hangout 110 can be seen as an endorsement of the hangout 110.

For example, suppose User 1 102 has reviewed the follower details 806 for User 4 108 and decided that they would like to begin a friendship with User 4 108. Accordingly, the User 1 102 may send a user request 802 using the client 230 to the computing device 210. The user request 802 may be a particular type of request. Specifically, the user request 802 may be a friend request. "Friend request" refers to a request from a sender to enter a friendship relationship with a receiver. Often the sender and receivers are both people. In certain embodiments, one or both of the sender and receivers may not be a person. The friend request may include a unique identifier that identifies the User 4 108 and/or a unique identifier that identifies the hangout 110 (such as a hangout 110 selected by User 1 102) that User 1 102 is associated with and with which the User 4 108 is associated (is a follower).

The computing device 210 may send, or forward, the friend request to a follower of a selected hangout 110 in response to the friend request initiated by the User 1 102. In one embodiment, the follower (e.g., User 4 108) is specifically identified in the friend request. Alternatively, or in addition, a user may send a friend request to any follower of a particular selected hangout 110.

The receiver of the friend request may have the option of automatically accepting friend requests or only accepting friend request if the receiver provides an affirmative response. In this example, suppose User 4 108 receives the friend request and decides to affirmatively accept the friend request. In certain embodiments, the receiver (e.g., User 4 108) may review follower details 806 about the sender before accepting the friend request.

If the receiver rejects the friend request, the system 200 may notify the sender. If the receiver accepts the friend request, the system 200 may register an acceptance of the friend request by the receiver/follower. "Acceptance" refers to a signal, message, or indicator that communicates that a request is approved, acknowledged, and/or accepted. An acceptance can be communicated using any communication message, signal, gesture, and/or indicator.

Figure 12:
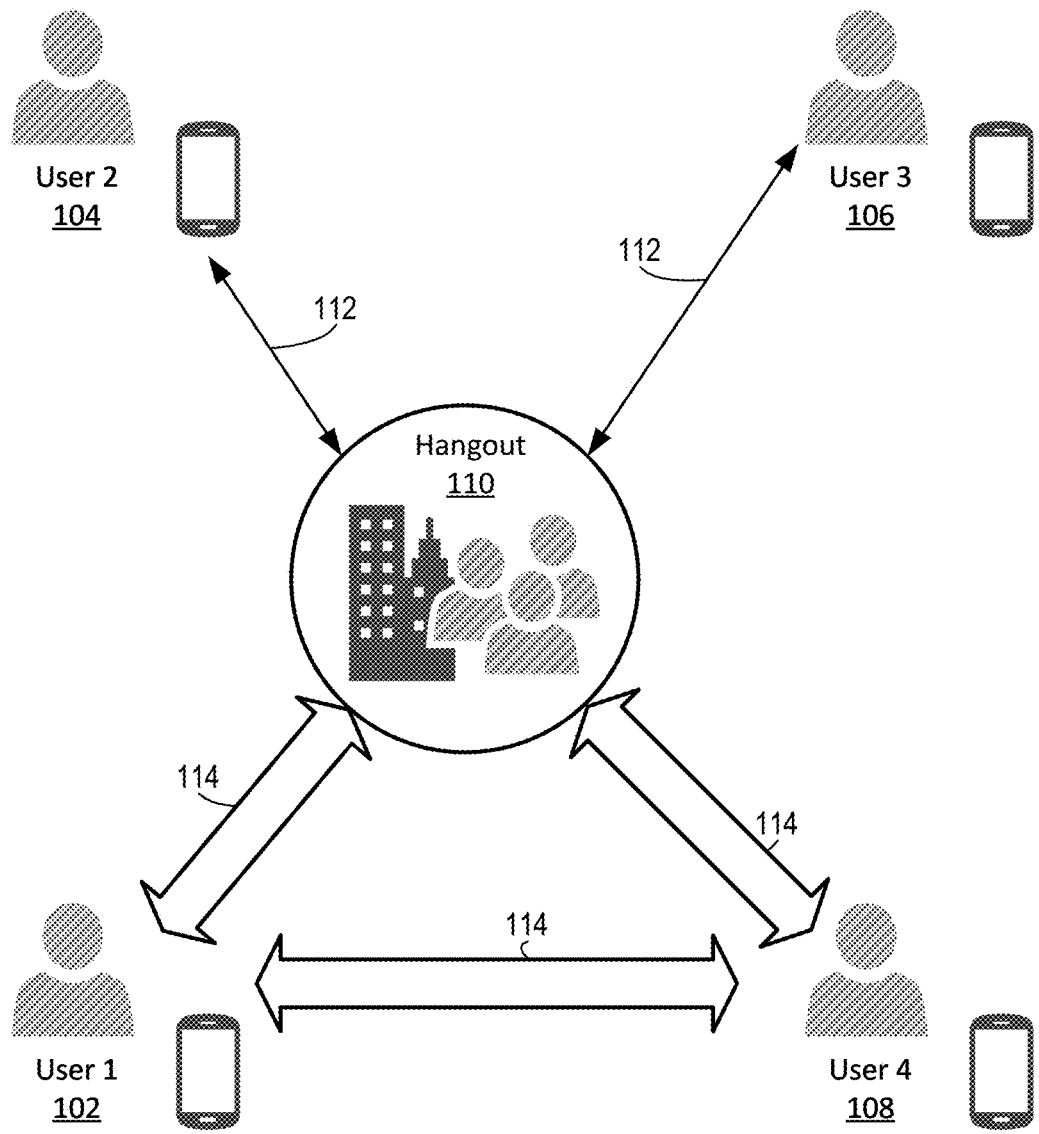
FIG. 12 is a schematic block diagram depicting two users connected by way of a hangout, according to one or more examples of the present disclosure.

Registering the acceptance may include making a record in the system 200 that the sender and receiver, who are each followers of a particular hangout 110, are in a friend relationship 114. The system 200 may create a friend relationship 114 between a follower (e.g., User 4 108) and the user (e.g., User 1 102). FIG. 12 is a schematic block diagram depicting two users (e.g., User 1 102 and User 4 108) connected by way of a hangout. The users now have a friend relationship 114. This relationship is represented by the solid double arrow friend relationship 114.

In one embodiment, the system 200 may implement management of friend requests and acceptance of rejection using an Access Control List (ACL). In one embodiment, the ACL is implemented in a database. One record in the database may be configured to permit the user initiating the friend request to write an indicator or token but the same user may be restricted from reading from this same record. Correspondingly, the receiver of the friend request may only be permitted to read same record but prevented from writing to the same record. An acceptance/rejection of a friend request may be similarly configured but with a second record of the database, the receiver can write the acceptance/rejection to the second record, but can not read from the second record. The sender of the friend request can read the second record, but can not write to the second record. In this manner, the system 200 can help protect users/followers from a malicious actor who may attempt to accept or reject false friend requests.

Once the friend relationship 114 is established between two users who also have a friend relationship 114 with a common hangout 110, the system 200 may facilitate direct communication sessions between the users (e.g., chat sessions between the users). Alternatively, or in addition, additional features can be provided to the users. For example, one or more users who have a friend relationship 114 with the hangout 110 can receive notifications of one or more hangout-centric events. "Hangout-centric event" refers to an event for which a hangout is the main or central component and/or aspect for the event. Often a hangout-centric event is an event that is hosted at or by a hangout and/or is sponsored by the hangout.

One example of a hangout-centric event is event such as a party or celebration that is hosted by and celebrated at the hangout 110. For example, a hangout 110 may sponsor a party to celebrate which sports team wins a championship match. Another hangout-centric event could be a celebration for a holiday or an anniversary for the hangout 110 or for another organization. In certain embodiments, the hangout-centric event is a promotion for a particular product or service that is supported by or available at or through the hangout 110.

Another example of a hangout-centric event when one or more followers starting a work shift at the hangout 110. Alternatively, or in addition, a user may configure their profile to receive a notification when a particular follower and/or a friend of the user starts a work shift at the hangout 110.

In still another example, a hangout-centric event can include when a friend of a user changes their presence status for the hangout 110. "Presence status" refers to a state or condition in relation to being present or not present at a particular location. The location can be physical or virtual. In certain embodiments, the system 200 may implement a presence feature to indicate user presence status. In one embodiment, a user can be notified when a another user, such as one with whom, this user has a friend relationship 114 changes presence status, from not present to present or from present to not present.

The presence feature is a way for users to be identified as being at a particular hangout 110 or not. In the case of a physical hangout 110, the presence feature enables a user to identify whether they are physically at the hangout 110. In one embodiment, the presence feature is completely under the control of the user. In other words, no presence information is made available unless the user authorizes disclosing the presence information. In certain embodiments, the presence feature may be available to all users, only users who are followers, users with a tentative relationship 112 with the hangout 110, and/or users having a friend relationship 114 with the hangout 110 and/or with each other.

In one embodiment, a check-in/check-out system is used to implement a presence feature. In a check-in/check-out system, a follower is not identified as present at a hangout 110 unless they have checked-in. Once a follower checks out, they are no longer identified as present at the hangout 110. In certain embodiments, the presence feature can be implemented using a check-in/check-out system and each follower is responsible for sending either a check-in message or a check-out message to indicate their presence status. "Check-in message" refers to any message, signal, or indicator that is configured to communicate or convey that the sender is present or available for a particular event or activity or at a particular location. "Check-out message" refers to any message, signal, or indicator that is configured to communicate or convey that the sender is not present or is unavailable for a particular event or activity or at a particular location.

In certain embodiments, a follower can send a check-in message from the client 230 to the computing device 210. The computing device 210 can register the follower as present at a particular hangout 110. When present at a particular hangout 110 the client 230 may include one or more indicators that show the checked-in or present status (e.g., a star icon, highlighting, including the user on a list of followers who are present, and the like). The check-in message may trigger a hangout-centric event. For example, the hangout-centric event may be a notification to each friend of the follower who has checked-in that indicates that the follower has checked-in. Those of skill in the art will appreciate that similar notifications and/or events can be triggered when a follower indicates that they are not longer present (e.g., sends a check-out message). For example, the computing device 210 can register the follower as not present at a particular hangout 110 in response to a check-out message from the follower.

Use of a check-in/check-out system can protect follower's privacy and empower them to control presence information that the system 200 has about the follower. Advantageously, the check-in messages and check-out messages can serve as an affirmative message from the user/follower of their intent to make their presence known. "Affirmative message" refers to any message, signal, or indicator that is configured to communicate agreement by a sender to a particular cause, action, activity, proposal, or proposition.

In certain embodiments, a user may attempt to spoof that they are checked-in. In such an embodiment, the system 200 may include a question posed to the user which they can only answer if they are in fact physically present at the hangout 110. In this manner, spoof check-ins can be avoided.

Figure 13:
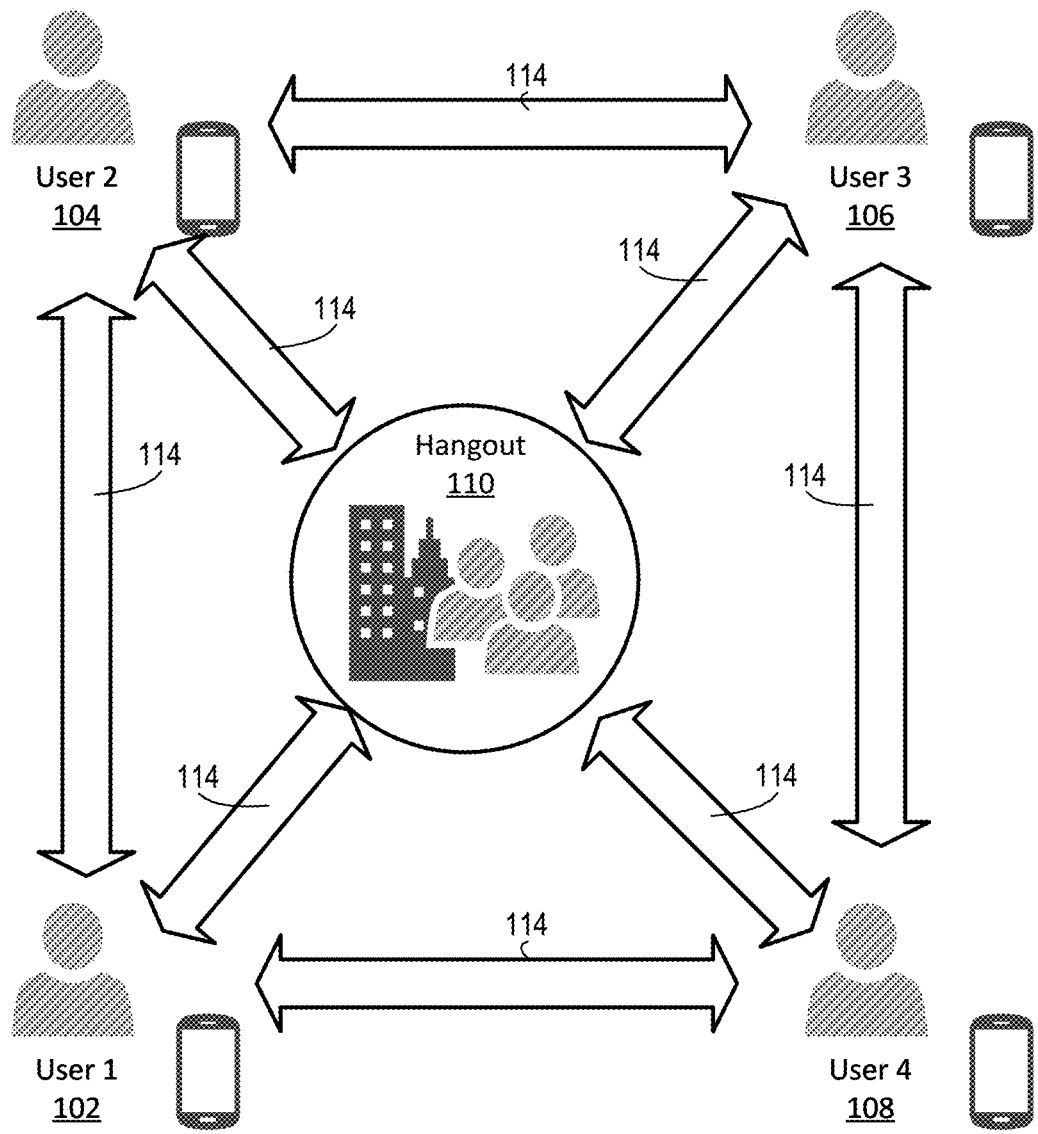
FIG. 13 is a schematic block diagram depicting four users connected by way of a hangout, according to one or more examples of the present disclosure.

FIG. 13 is a schematic block diagram depicting four users connected by way of a hangout, according to one or more examples of the present disclosure. Each of the users has a friend relationship 114 with the hangout 110 and with each other. In certain embodiments, users with friend relationships 114 with a hangout 110 and/or each other may have access to additional features. With a presence feature, the system 200 may provide follower presence data to one or more users or followers of a hangout 110. For example, referring to FIG. 9, selection of the navigation control 602 labeled "Who's here" can provide a user with a set of followers who are currently present at a hangout 110. In another embodiment, followers may be included in the set if they have affirmatively checked-in.

Advantageously, the system 200 can enable one user to efficiently coordinate and arrange to meet with friends at a particular hangout 110. For example, a user may send a user request 802 to the computing device 210 referred to herein as a hangout invitation. "Hangout invitation" refers to an invitation from a person or entity to join together in a social gathering at a particular hangout. Typically, the hangout referenced in the invitation will be a single hangout that can be uniquely identified. In particular, a first user can send a user request 802 configured to invite one or more users who are friends with the first user. The users identified in the user request 802 may or may not be users of the system 200, followers of a particular hangout 110, friends of a hangout 110, and/or friends of the first user. In one embodiment, the hangout invitation is an impromptu hangout invitation. In one embodiment, impromptu hangout invitation may only be sent to users having a friend relationship 114 relationship with the hangout 110.

Alternatively, or in addition, the system 200 may only send the impromptu hangout invitation to followers who are not currently present at the hangout 110. Or, the system 200 may only send the impromptu hangout invitation to follower who are currently present at the hangout 110. Such an invitation may be an invitation to meet up in person at the hangout 110. In one embodiment, an impromptu hangout invitation is another example of a hangout-centric event. In one embodiment, the system 200 may send an impromptu hangout invitation from the user (and may identify the user) to one or more followers of a hangout 110 in response to user input to the system 200 requesting follower presence data.

Figure 14:
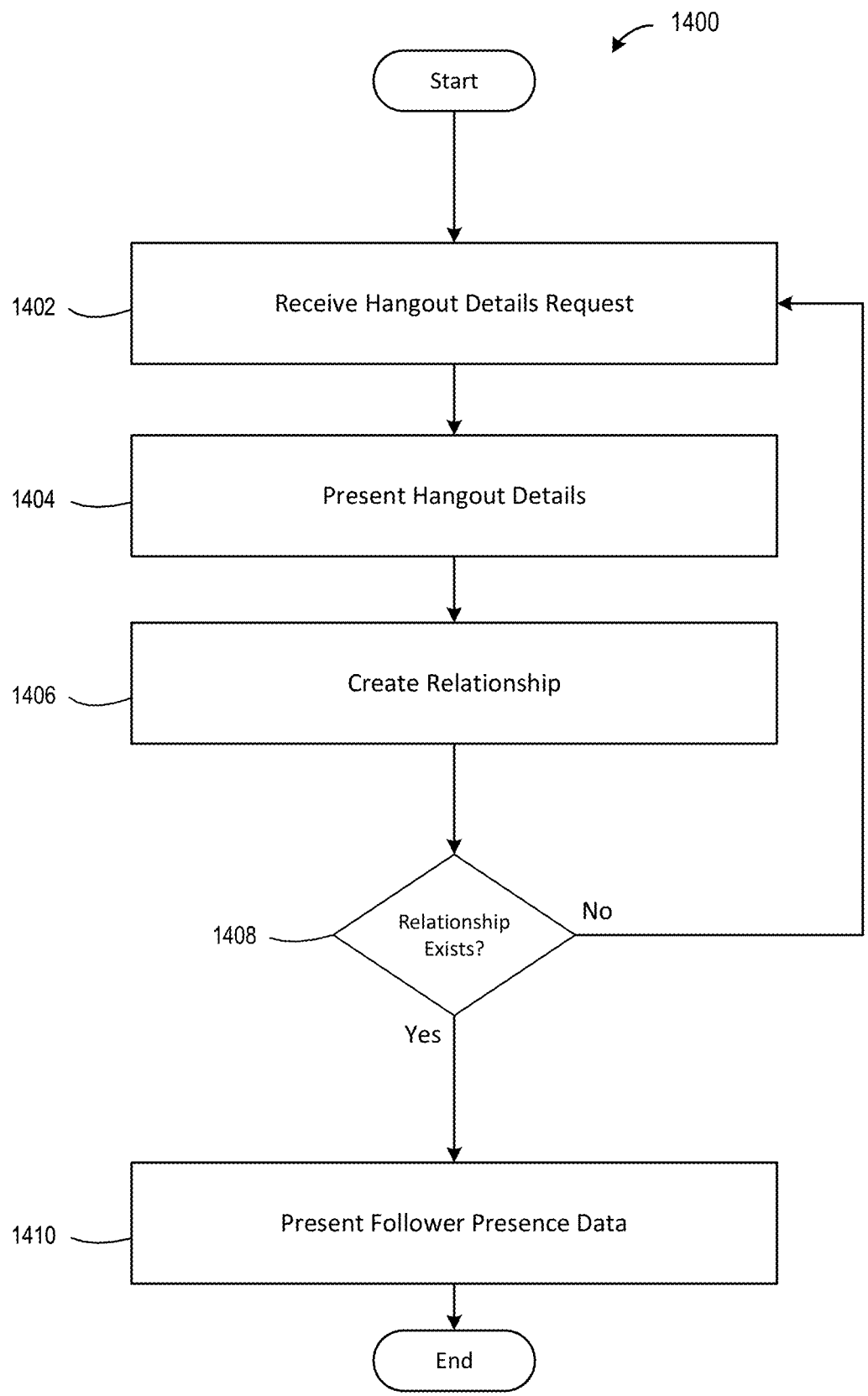
FIG. 14 is a flow chart diagram of one example method for connecting users by way of a common hangout according to one embodiment.

FIG. 14 is a flow chart diagram of one example method for connecting users by way of a common hangout according to one embodiment. As shown, the method 1400 may begin with a step 1402 in which a system 200 or apparatus receives 1402 a hangout details request from a user over a computer network 220. Next, the system 200 may present hangout details about a hangout 110 (e.g., such as a hangout selected by the user) to the user. For example, the system 200 may present hangout details about a hangout 110 in response to a user request 802 from the user. In certain embodiments, the system 200 may present hangout details about a plurality of hangouts 110. For example, hangout details for hangouts 110 registered with the system 200 may be presented within a certain radius of the user.

In step 1406, the system 200 may create a relationship (e.g., a follower or a friend relationship) between the user and the hangout 110 in response to the user selecting the hangout 110. In step 1408, a condition may be evaluated. Specifically, the system 200 may determine whether the user has a relationship with the hangout 110, such as a selected hangout 110. In one embodiment, the relationship is a friend relationship 114. In another embodiment, the relationship is a follower relationship.

If the user does not have a requisite relationship with the hangout 110, the method 1400 may return to step 1402 and the user is not able to review follower presence data. If the user does have a requisite relationship with the hangout 110, the method 1400 may continue and the system 200 may present 1410 follower presence data to the user. Next, the method 1400 may end. In certain embodiments, the follower presence data may be presented for a hangout 110 that exists in a physical location. Alternatively, or in addition, the follower presence data may only be presented 1410 if the user has checked-in indicating that the user is physically present at the hangout 110. In certain embodiments, the follower presence data may only be presented 1410 if the user has sent a user request 802 requesting follower presence data.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, FIG., or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. § 112 Para. 6. It will be apparent to those having skill in the art that changes may be made to the details of the above-described embodiments without departing from the underlying principles set forth herein.

While specific embodiments and applications of the present disclosure have been illustrated and described, it is to be understood that the scope of this disclosure is not limited to the precise configuration and components disclosed herein. Various modifications, changes, and variations which will be apparent to those skilled in the art may be made in the arrangement, operation, and details of the methods and systems of the present disclosure set forth herein without departing from it spirit and scope.

What is claimed is:

1. An apparatus comprising:
a processor; and
a memory that stores code executable by the processor to:
receive a request for details concerning a specific establishment where multiple users gather, the specific establishment being at a specific physical location, from a user over a network;
present details to the user concerning the specific establishment at the specific physical location, response to the request;
create a relationship between the user and the specific establishment at the specific physical location, in response to the user selecting the specific establishment at the specific physical location, wherein the relationship further comprises a specific ongoing association between the user and the specific establishment at the specific physical location;
wherein creating the relationship between the user and the specific establishment enables the user to broadcast messages to at least one additional user with a relationship to the specific establishment, the broadcast messages indicating at least that the broadcasting user is currently present at the specific establishment, proposing that at least one additional specific user with a relationship to the specific establishment meet the broadcasting user at the specific establishment at a given time, and indicating that the broadcasting user is no longer present at the specific establishment; and
present follower data to the user, the follower data for one or more followers associated with the specific establishment at the specific physical location.

2. The apparatus of claim 1, wherein the follower data is presented only after the user forms the relationship with the specific establishment at the specific physical location.

3. The apparatus of claim 1, where the code is further executable by the processor to broadcast an impromptu invitation from the user to one or more friends of the user to join together in a specific social gathering at the specific establishment at the specific physical location in response to a user request.

4. The apparatus of claim 1, where the code is further executable by the processor to:
receive a search query from the user;
present a summary for two or more specific establishments at two or more specific physical locations within a predefined geographic area in response to the search query; and
wherein the request for details concerning the specific establishment where multiple users gather, the specific establishment being at the specific physical location is associated with at least one of the two or more summaries presented.

5. The apparatus of claim 1, where the code is further executable by the processor to broker a friendship between the user and one or more followers associated with the specific establishment at the specific physical location.

6. The apparatus of claim 1, where the code is further executable by the processor to mediate a communication session between the user and one or more friends of the user.

7. The apparatus of claim 1, where the code is further executable by the processor to present follower presence data to the user for one or more followers associated with the specific establishment at the specific physical location.

8. A method comprising:
receiving a request concerning a specific establishment where multiple users gather, the specific establishment being at a specific physical location from a user over a network;
presenting details to the user concerning the specific establishment at the specific physical location, response to the request;
creating a relationship between the user and the specific establishment at the specific physical location, in response to the user selecting the specific establishment at the specific physical location, wherein the relationship further comprises a specific ongoing association between the user and the specific establishment at the specific physical location;
wherein creating the relationship between the user and the specific establishment enables the user to broadcast messages to at least one additional user with a relationship to the specific establishment, the broadcast messages indicating at least that the broadcasting user is currently present at the specific establishment, proposing that at least one additional specific user with a relationship to the specific establishment meet the broadcasting user at the specific establishment at a given time, and indicating that the broadcasting user is no longer present at the specific establishment; and
presenting follower presence data to the user of at least one follower associated with the specific establishment at the specific physical location.

9. The method of claim 8, wherein the follower presence data is presented only after the user forms the relationship with the selected specific establishment at the specific physical location.

10. The method of claim 8, further comprising broadcasting an impromptu invitation to join together in a specific social gathering at the specific establishment at the specific physical location, from the user to one or more followers of the specific establishment at the specific physical location in response to a user request.

11. The method of claim 8, further comprising presenting follower details to the user for followers associated with the selected specific establishment at the specific physical location.

12. The method of claim 8, further comprising:
sending a friend request on behalf of the user to a follower of the selected specific establishment at the specific physical location in response to the user initiating the friend request;
registering an acceptance of the friend request by the follower of the selected specific establishment at the specific physical location; and
creating a friendship between the follower of the selected specific establishment at the specific physical location and the user in response to the acceptance by the follower.

13. The method of claim 8, further comprising:
notifying a user in response to one or more events for which the specific establishment at the specific physical location is a main or central component and/or aspect; and
wherein the events which the specific establishment at the specific physical location is the main or central component and/or aspect comprise a friend of the user changing their presence status for the specific establishment being at the specific physical location, an event occurring at the specific establishment being at the specific physical location, and a follower starting a work shift at the specific establishment being at the specific physical location.

14. The method of claim 8, further comprising:
registering a follower as present at the specific establishment at the specific physical location in response to a check-in message from the follower; and
registering a follower as not present at the specific establishment at the specific physical location in response to a check-out message from the follower.

15. The method of claim 8, wherein follower presence data comprises an indication that the follower is physically present at the selected specific establishment at the specific physical location in response to an affirmative message from the follower.

16. The method of claim 8, wherein the follower comprises one of a host at the specific establishment at the specific physical location, an owner of the specific establishment at the specific physical location, a patron of the specific establishment at the specific physical location, an employee at the specific establishment at the specific physical location, and a user.

17. The method of claim 8, further comprising mediating a communication session between the user and one or more friends of the user.

18. The method of claim 17, wherein the communication session is exclusively an asynchronous communication session.

19. A program product comprising a non-transitory computer readable storage medium that stores code executable by a processor, the executable code comprising code to:
present a plurality of summaries for a plurality of specific establishments at a plurality specific physical locations within a predefined geographic area in response to a geographic search query from a user;
receive a request for details concerning a specific establishment where multiple users gather, the specific establishment being at a specific physical location, from the user over a network;
present details to the user concerning the specific establishment at the specific physical location, response to the request;
create a relationship between the user and the specific establishment at the specific physical location, in response to the user selecting the specific establishment at the specific physical location, wherein the relationship further comprises a specific ongoing association between the user and the specific establishment at the specific physical location;
wherein creating the relationship between the user and the specific establishment enables the user to broadcast messages to at least one additional user with a relationship to the specific establishment, the broadcast messages indicating at least that the broadcasting user is currently present at the specific establishment, proposing that at least one additional specific user with a relationship to the specific establishment meet the broadcasting user at the specific establishment at a given time, and indicating that the broadcasting user is no longer present at the specific establishment;
present follower data to the user, the follower data for one or more followers associated with the specific establishment at the specific physical location; and
broker a friendship between the user and at least one follower associated with the specific establishment at the specific physical location.

20. The program product of claim 19, wherein the executable code comprises code to broadcast an impromptu invitation from the user to one or more friends of the user to join together in a specific social gathering at the specific establishment at the specific physical location in response to a user request.

* * * * *